United States Patent
Richards et al.

(10) Patent No.: US 8,612,989 B1
(45) Date of Patent: Dec. 17, 2013

(54) ASSIGNING RESOURCES AMONG MULTIPLE GROUPS OF WORKLOADS IN A DATABASE SYSTEM

(75) Inventors: Anita Richards, San Juan Capistrano, CA (US); Douglas P. Brown, Rancho Sante Fe, CA (US)

(73) Assignee: Teradata US, Inc., Dayton, OH (US)

( * ) Notice: Subject to any disclaimer, the term of this patent is extended or adjusted under 35 U.S.C. 154(b) by 222 days.

(21) Appl. No.: 12/966,063

(22) Filed: Dec. 13, 2010

Related U.S. Application Data

(63) Continuation-in-part of application No. 12/897,023, filed on Oct. 4, 2010.

(51) Int. Cl.
*G06F 9/46* (2006.01)

(52) U.S. Cl.
USPC .......................................................... 718/105

(58) Field of Classification Search
USPC ............................................................ 718/105
See application file for complete search history.

(56) References Cited

U.S. PATENT DOCUMENTS

| | | | |
|---|---|---|---|
| 2008/0077927 A1* | 3/2008 | Armstrong et al. | 718/104 |
| 2010/0312762 A1* | 12/2010 | Yan et al. | 707/716 |

* cited by examiner

*Primary Examiner* — Mengyao Zhe
(74) *Attorney, Agent, or Firm* — Howard Speight

(57) ABSTRACT

A computer running a database system receives a query. The database system services a plurality of collections. Each collection includes a plurality of workload groups. Each collection is assigned a percentage of a resource for its use. A donor collection, $C_{donor}$, is not using its assigned percentage of the resource during a time slice tJ. The length in time of time slice tJ is less than a time in which the query is expected to execute. The query is assigned to a workload group. The assignment is determined by the computer applying a workload classification and an exception criteria to parameters of the query. The workload group is part of a donee collection, $C_{donee}$, different from the donor collection. The donor collection donates, through the computer, use of a boost percentage of the resource to the donee collection during the time slice tJ. The boost percentage is proportional to the percentage of the resource assigned to the donee collection, the percentage of the resource assigned to the donor collection, and a Greediness Value related to the amount of the donor collection's allocated percentage of the resource available to be donated. The query is executed by the computer during time slice tJ, with the donee collection using its allocated percentage of the resource plus the boost percentage of the resource to execute the query.

9 Claims, 20 Drawing Sheets

| | Workload | SLGs | Pecking Order | CPU Consumed | | | |
|---|---|---|---|---|---|---|---|
| PRE-EMPTIVE | WD-DE-CRMTact | <=2 | 1 | 2% | X | | |
| | WD-USA-Tact | <=2 | 1 | | | X | |
| | WD-HK-Tact | <=2 | 1 | 1% | | | X |
| | WD-DE-CallCtr-Tact | <=15 | 2 | 4% | X | | |
| | WD-DE-XYZ | RQ 2% | 3 | 10% | X | | |
| | WD-USA-XYZ | RQ 4% | 3 | | | X | |
| | WD-HK-XYZ | RQ 3% | 3 | 5% | | | X |
| | WD-DE-CRM | WQ 15% | 4 | 2% | X | | |
| | WD-HK-CRM | WQ 12% | 4 | 3% | | | X |
| TIME-SHARE | WD-HK-mktg | | D-1 | | | | X |
| | WD-USA-TPUMP | | D-2 | | | X | |
| | WD-HK-TPUMP | | D-2 | 1% | | | X |
| | WD-USA-Strategic | | D-3 | 35% | | X | |
| | WD-DE-Strategic | | D-3 | 47% | X | | |
| | WD-HK-ETL | | D-4 | | | | X |
| | WD-DE-ETL | | D-4 | | X | | |
| | | | | | | | |
| | Collection | | | | Germany | USA | HK |
| | | | | | 55% | 35% | 10% |
| | | | | | Collective Assignment | | |

*FIG. 18*

|  | Workload | SLGs | Pecking Order | CPU Consumed | Actual Collective Usage | | |
|---|---|---|---|---|---|---|---|
|  |  |  |  |  | 55% | 35% | 10% |
| PRE-EMPTIVE | WD-DE-CRMTact | <=2 | 1 | 2% | X |  |  |
|  | WD-USA-Tact | <=2 | 1 |  |  | X |  |
|  | WD-HK-Tact | <=2 | 1 | 1% |  |  | X |
|  | WD-DE-CallCtr-Tact | <=15 | 2 | 4% | X |  |  |
|  | WD-DE-XYZ | RQ 2% | 3 | 10% | X |  |  |
|  | WD-USA-XYZ | RQ 4% | 3 |  |  | X |  |
|  | WD-HK-XYZ | RQ 3% | 3 | 5% |  |  | X |
|  | WD-DE-CRM | WQ 15% | 4 | 2% | X |  |  |
|  | WD-HK-CRM | WQ 12% | 4 | 3% |  |  | X |
| TIME-SHARE | WD-HK-mktg |  | D-1 |  |  |  | X |
|  | WD-USA-TPUMP |  | D-2 |  |  | X |  |
|  | WD-HK-TPUMP |  | D-2 | 1% |  |  | X |
|  | WD-USA-Strategic |  | D-3 | 35% |  | X |  |
|  | WD-DE-Strategic |  | D-3 | 47% | X |  |  |
|  | WD-HK-ETL |  | D-4 |  |  |  | X |
|  | WD-DE-ETL |  | D-4 |  | X |  |  |
|  |  |  |  |  |  |  |  |
|  | Collection |  |  |  | Germany | USA | HK |
|  |  |  |  |  | 55% | 35% | 10% |
|  |  |  |  |  | Collective Assignment | | |

FIG. 19

|  | Workload | SLGs | Pecking Order | CPU Consumed | Actual Collective Usage | | |
|---|---|---|---|---|---|---|---|
|  |  |  |  |  | 68% | 20% | 12% |
| PRE-EMPTIVE | WD-DE-CRMTact | <=2 | 1 | 2% | X | | |
|  | WD-USA-Tact | <=2 | 1 |  | | X | |
|  | WD-HK-Tact | <=2 | 1 | 1% | | | X |
|  | WD-DE-CallCtr-Tact | <=15 | 2 | 4% | X | | |
|  | WD-DE-XYZ | RQ 2% | 3 | 10% | X | | |
|  | WD-USA-XYZ | RQ 4% | 3 |  | | X | |
|  | WD-HK-XYZ | RQ 3% | 3 | 5% | | | X |
|  | WD-DE-CRM | WQ 15% | 4 | 2% | X | | |
|  | WD-HK-CRM | WQ 12% | 4 | 3% | | | X |
| TIME-SHARE | WD-HK-mktg |  | D-1 |  | | | X |
|  | WD-USA-TPUMP |  | D-2 |  | | X | |
|  | WD-HK-TPUMP |  | D-2 | 1→3% | | | X |
|  | WD-USA-Strategic |  | D-3 | 35→20% | | X | |
|  | WD-DE-Strategic |  | D-3 | 47→60% | X | | |
|  | WD-HK-ETL |  | D-4 |  | | | X |
|  | WD-DE-ETL |  | D-4 |  | X | | |
|  | Collection |  |  |  | Germany | USA | HK |
|  |  |  |  |  | 55% | 35% | 10% |
|  |  |  |  |  | Collective Assignment | | |

FIG. 20

|  | Workload | SLGs | Pecking Order | CPU Consumed | Actual Collective Usage ||||
|---|---|---|---|---|---|---|---|
|  |  |  |  |  | 55% | 20% | 3% |
| PRE-EMPTIVE | WD-DE-CRMTact | <=2 | 1 | 2% | X |  |  |
|  | WD-USA-Tact | <=2 | 1 |  |  | X |  |
|  | WD-HK-Tact | <=2 | 1 |  |  |  | X |
|  | WD-DE-CallCtr-Tact | <=15 | 2 | 4% | X |  |  |
|  | WD-DE-XYZ | RQ 2% | 3 | 10% | X |  |  |
|  | WD-USA-XYZ | RQ 4% | 3 |  |  | X |  |
|  | WD-HK-XYZ | RQ 3% | 3 | 1% |  |  | X |
|  | WD-DE-CRM | WQ 15% | 4 | 2% | X |  |  |
|  | WD-HK-CRM | WQ 12% | 4 | 2% |  |  | X |
| TIME-SHARE | WD-HK-mktg |  | D-1 |  |  |  | X |
|  | WD-USA-TPUMP |  | D-2 |  |  | X |  |
|  | WD-HK-TPUMP |  | D-2 |  |  |  | X |
|  | WD-USA-Strategic |  | D-3 | 20% |  | X |  |
|  | WD-DE-Strategic |  | D-3 | 47% | X |  |  |
|  | WD-HK-ETL |  | D-4 |  |  |  | X |
|  | WD-DE-ETL |  | D-4 |  | X |  |  |
|  |  |  |  |  |  |  |  |
|  | Collection |  |  |  | Germany | USA | HK |
|  |  |  |  |  | 55% | 35% | 10% |
|  |  |  |  |  | Collective Assignment |||

*FIG. 21*

|  | Workload | SLGs | Pecking Order | CPU Consumed | Actual Collective Usage | | |
|---|---|---|---|---|---|---|---|
|  |  |  |  |  | 55% | 35% | 10% |
| PRE-EMPTIVE | WD-DE-CRMTact | <=2 | 1 | 4% | X |  |  |
|  | WD-USA-Tact | <=2 | 1 | 3% |  | X |  |
|  | WD-HK-Tact | <=2 | 1 |  |  |  | X |
|  | WD-DE-CallCtr-Tact | <=15 | 2 | 5% | X |  |  |
|  | WD-DE-XYZ | RQ 2% | 3 | 10% | X |  |  |
|  | WD-USA-XYZ | RQ 4% | 3 | 20% |  | X |  |
|  | WD-HK-XYZ | RQ 3% | 3 |  |  |  | X |
|  | WD-DE-CRM | WQ 15% | 4 | 46%, not met | X |  |  |
|  | WD-HK-CRM | WQ 12% | 4 |  |  |  | X |
| TIME-SHARE | WD-HK-mktg |  | D-1 |  |  |  | X |
|  | WD-USA-TPUMP |  | D-2 | 5% |  | X |  |
|  | WD-HK-TPUMP |  | D-2 |  |  |  | X |
|  | WD-USA-Strategic |  | D-3 | 7% |  | X |  |
|  | WD-DE-Strategic |  | D-3 | cannot service | X |  |  |
|  | WD-HK-ETL |  | D-4 | 10% |  |  | X |
|  | WD-DE-ETL |  | D-4 |  | X |  |  |
|  | Collection |  |  |  | Germany | USA | HK |
|  |  |  |  |  | 55% | 35% | 10% |
|  |  |  |  |  | Collective Assignment | | |

FIG. 22

ASSIGNING RESOURCES AMONG MULTIPLE GROUPS OF WORKLOADS IN A DATABASE SYSTEM

CROSS-REFERENCE TO RELATED APPLICATIONS

This application is a Continuation in Part of U.S. patent application Ser. No. 12/897,023, entitled "Assigning Resources in a Database System," filed on Oct. 4, 2010.

BACKGROUND

A Database Management System ("DBMS") runs on a computer system that may include one or more computers. The computer system has resources, such as the central processing unit ("CPU"), memory, storage, input/output ("I/O"), etc., that are shared between the DBMS and other programs or systems that are running on the computer system. The DBMS itself may have resources that may be shared among different DBMS tasks that are executing at the same time. The assignment of resources among DBMS tasks is sometimes based on prioritizing tasks, with higher priority tasks being more likely, at any given time, to be assigned a greater share of the DBMS and computer system resources.

The DBMS may have service level goals ("SLGs"), which are predefined sets of one or more performance criteria that are to be satisfied during execution of one or more queries. Each workload group, which are sets of queries or other database requests that are grouped together because of one or more parameters, may have its own set of SLGs that are particular to that workload group. A database administrator ("DBA") may have parameters and "performance knobs" that can be adjusted to dedicate larger or smaller portions of computer system and DBMS resources based on ad hoc needs of clients. Making these adjustments can be a challenge especially if the parameters and performance knobs are numerous or if they do not relate directly to actual business goals for the workloads themselves or if the settings established for one workload can contradict the settings established for other workloads.

Commercial databases often tend to mix multiple business units into a single system to maximize economy of scale benefits. This is especially useful when one business unit would otherwise only need a fraction of the smallest-sized system to meet its needs.

For example, a single international database system may support the operations of many different business units simultaneously, where each business unit is responsible for supporting the costs of that business unit's share of the system. Because the business unit pays for that share of the system, it expects to have access to that share of the system, at least for times when it has active demand for the system. When the business unit does not have active demand for the system, in most cases the business unit shares its idle resources with other active business units until its demand returns, to help maximize the return on the system as a whole.

Within each business unit, a mix of different priority workloads may be present. Similarly, other large database systems may find themselves sharing a single system across different business units, especially in the cases of mergers and acquisitions, where delineating usage between business units can be even more important.

Effectively sharing system resources across different business units while maintaining the priority directives outlined within each individual business unit, especially those defined based on Service Level Goal (SLG) directives, is a challenge.

SUMMARY

In general, in one aspect, the invention features a computer-implemented method. The method includes receiving a query to be run on a database system running on a computer. The database system services a plurality of collections. Each collection includes a plurality of workload groups. Each collection is assigned a percentage of a resource for its use. The method further includes a donor collection, $C_{donor}$, not using its assigned percentage of the resource during a time slice tJ. The length in time of time slice tJ is less than a time in which the query is expected to execute. The method further includes assigning the query to a workload group. The assignment is determined by the computer applying a workload classification and an exception criteria to parameters of the query. The workload group is part of a donee collection, $C_{donee}$, different from the donor collection. The method further includes the donor collection donating, through the computer, use of a boost percentage of the resource to the donee collection during the time slice tJ. The boost percentage is proportional to the percentage of the resource assigned to the donee collection, the percentage of the resource assigned to the donor collection, and a Greediness Value related to the amount of the donor collection's allocated percentage of the resource available to be donated. The method further includes executing the query by the computer during time slice tJ, with the donee collection using its allocated percentage of the resource plus the boost percentage of the resource to execute the query.

Implementations of the invention may include one or more of the following. The boost percentage may be calculated by the computer according to the following equation:

$$C_{donee\_}\text{boost}_{donor} = \frac{(100 - C_{donor\_}GV)}{100} \cdot C_{donor\_}\text{idle} \cdot \frac{C_{donee\_}\text{share}}{100 - C_{donor\_}\text{share}}$$

where:
there are n collections: $C_{1\text{-}n}$;
$C_{donee\_}\text{boost}_{donor}$ is the increased allocation of a resource to collection $C_{donee}$ resulting from the generosity of collection $C_{donor}$;
$C_{donor\_}GV$ is the Greediness Value of collection $C_{donor}$;
$C_{donor\_}\text{idle}$ is the percentage of the resource allocated to collection $C_{donor}$ that is idle; and
$C_{i\_}$ share is the share of the resource allocated to collection $C_i$.

A second donor collection may not be using its assigned percentage of the resource during time slice tJ. The second donor collection may donate, through the computer, use of a second boost percentage of the resource to the donee collection during the time slice tJ, the second boost percentage being proportional to the percentage of the resource assigned to the donee collection. The computer may execute the query during time slice tJ, with the donee collection using its allocated percentage of the resource plus the boost percentage of the resource and the second boost percentage of the resource to execute the query.

In general, in another aspect, the invention features a database system. The database system runs on a computer. The database system includes one or more nodes. The database system includes a plurality of CPUs. Each of the one or more nodes provides access to one or more CPUs. The database system includes a plurality of virtual processes. Each of the one or more CPUs provides access to one or more virtual processes. Each virtual process is configured to manage data, including rows from the set of database table rows, stored in one of a plurality of data-storage facilities. The database system includes a process to receive a query to be run on the database system, the database system servicing a plurality of collections. Each collection includes a plurality of workload groups. Each collection is assigned a percentage of a resource for its use. A donor collection, $C_{donor}$, is not using its assigned percentage of the resource during a time slice tJ. The length in time of time slice tJ is less than a time in which the query is expected to execute. The process assigns the query to a workload group. The assignment is determined by the computer applying a workload classification and an exception criteria to parameters of the query. The workload group is part of a donee collection, $C_{donee}$, different from the donor collection. The donor collection donates, through the computer, use of a boost percentage of the resource to the donee collection during the time slice tJ. The boost percentage is proportional to the percentage of the resource assigned to the donee collection, the percentage of the resource assigned to the donor collection, and a Greediness Value related to the amount of the donor collection's allocated percentage of the resource available to be donated. The process executes the query during time slice tJ, with the donee collection using its allocated percentage of the resource plus the boost percentage of the resource to execute the query.

In general, in another aspect, the invention features a computer program, stored in a computer-readable tangible medium. The computer program includes executable instructions that cause a computer to receive a query to be run on a database system running on a computer. The database system services a plurality of collections. Each collection includes a plurality of workload groups. Each collection is assigned a percentage of a resource for its use. A donor collection, $C_{donor}$, is not using its assigned percentage of the resource during a time slice tJ. The length in time of time slice tJ is less than a time in which the query is expected to execute. The computer program includes executable instructions that cause the computer to assign the query to a workload group. The assignment is determined by the computer applying a workload classification and an exception criteria to parameters of the query. The workload group is part of a donee collection, $C_{donee}$, different from the donor collection. The computer program includes executable instructions that cause a computer to cause the donor collection to donate, through the computer, use of a boost percentage of the resource to the donee collection during the time slice tJ. The boost percentage is proportional to the percentage of the resource assigned to the donee collection, the percentage of the resource assigned to the donor collection, and a Greediness Value related to the amount of the donor collection's allocated percentage of the resource available to be donated. The computer program includes executable instructions that cause the computer to execute the query by the computer during time slice tJ, with the donee collection using its allocated percentage of the resource plus the boost percentage of the resource to execute the query.

BRIEF DESCRIPTION OF THE DRAWINGS

FIGS. 19-22 illustrate assigning resources among multiple groups of workloads in a database system.

DETAILED DESCRIPTION

Figure 1:
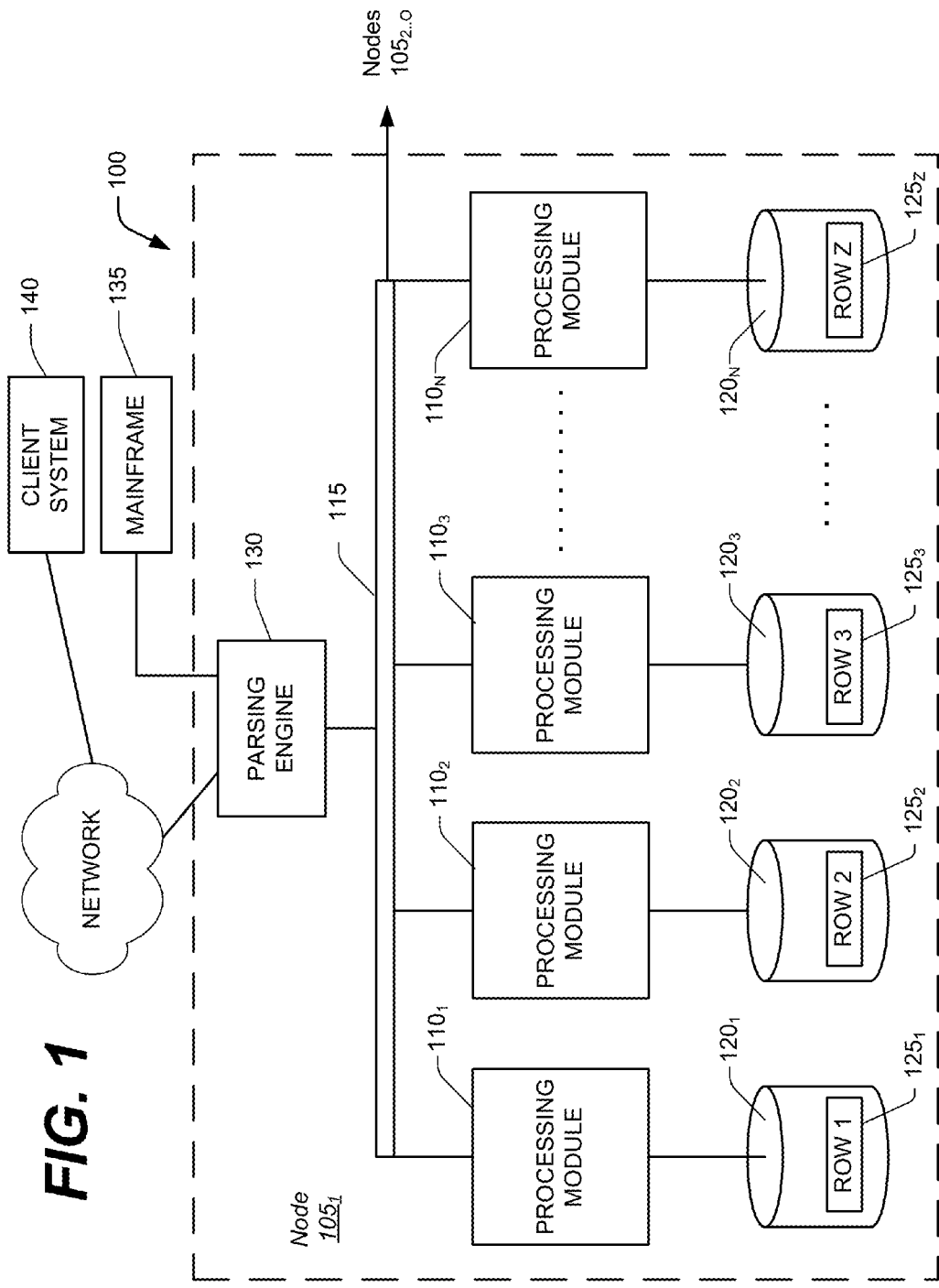
FIG. 1 is a block diagram of a node of a parallel processing database system.

The resource allocation technique disclosed herein has particular application, but is not limited, to large databases that might contain many millions or billions of records managed by a database system ("DBMS") 100 (or "system"), such as a Teradata Active Data Warehousing System available from the assignee hereof. FIG. 1 shows a sample architecture for one node $105_1$ of the DBMS 100. The DBMS node $105_1$ includes one or more processing modules $110_{1 \ldots N}$ (or "CPUs"), connected by a network 115, that manage the storage and retrieval of data in data-storage facilities $120_{1 \ldots N}$. The DBMS 100 may include multiple nodes $105_{2 \ldots N}$ in addition to the illustrated node $105_1$, connected by extending the network 115. In one embodiment, each node may consist of multiple sockets, each of which may have one or more cores. For the purposes of this application, a core will be referred to as a "CPU." In one embodiment, a "virtual processor" is a collection of processes that run on the same node and share a set of common resources. In one embodiment, a node may execute Y virtual processors on top of X CPUs, where Y can be greater than X. In one embodiment, for the purposes of this application, a "process" is a single instance of the execution environment of a single executable file, or program. In one embodiment, a "task" is a single thread of execution within a process. In one embodiment, a "partition" is a construct for grouping tasks together and managing them across multiple virtual processors.

Partitions, which are operating system ("OS") processes, run in virtual processors. Tasks, which are OS threads, run in partitions.

For the case in which one or more threads are running on a single virtual processor, the single virtual processor swaps among the threads.

For the case in which N threads are running on an M-virtual-processor node, the node's operating system schedules the N threads to run on its set of M virtual processors. The threads are spread among the virtual processors. For example, if there are 4 threads and 4 virtual processors, then typically each thread would run on its own virtual processor. If there are 8 threads and 4 virtual processors, the 8 threads would be spread among the 4 virtual processors, in which case swapping of the threads might occur.

Each of the processing modules $110_1 \ldots _N$ manages a portion of a database that is stored in a corresponding one of the data-storage facilities $120_1 \ldots _N$. Each of the data-storage facilities $120_1 \ldots _N$ includes one or more disk drives. The system stores data in one or more tables in the data-storage facilities 1201 . . . N. The rows 1251 . . . Z of the tables are stored across multiple data-storage facilities 1201 . . . N to ensure that the system workload is distributed evenly across the processing modules 1101 . . . N. A parsing engine 130 organizes the storage of data and the distribution of table rows 1251 . . . Z among the processing modules 1101 . . . N. The parsing engine 130 also coordinates the retrieval of data from the data-storage facilities 1201 . . . N in response to queries received from a user at a mainframe 135 or a client computer 140. The DBMS 100 usually receives queries and commands to build tables in a standard format, such as SQL.

In one implementation, the rows $125_1 \ldots _Z$ are distributed across the data-storage facilities $120_1 \ldots _N$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_1 \ldots _N$ and associated processing modules $110_1 \ldots _N$ by a hash bucket map. The characteristics of the columns chosen for the primary index determine how evenly the rows are distributed.

In addition to the physical division of storage among the storage facilities illustrated in FIG. 1, each storage facility is also logically organized. One implementation divides the storage facilities into logical blocks of storage space. Other implementations can divide the available storage space into different units of storage. The logical units of storage can ignore or match the physical divisions of the storage facilities.

Figure 2:
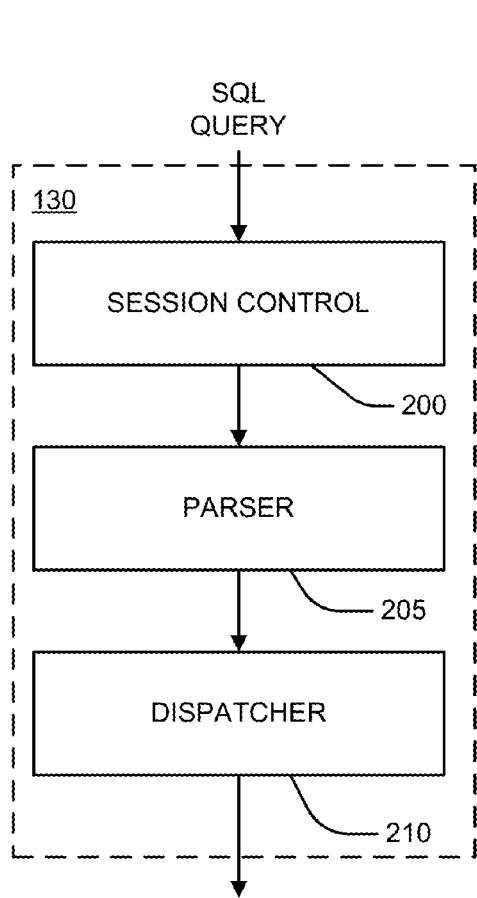
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
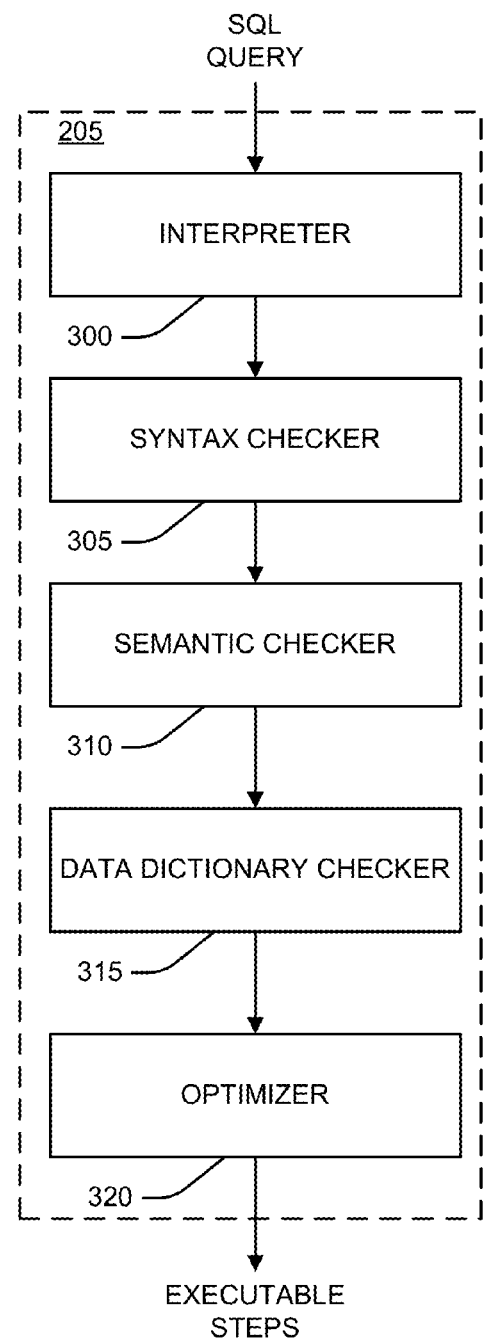
FIG. 3 is a block diagram of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request and produces executable steps to execute the plan. A dispatcher 210 issues commands to the processing modules $110_1 \ldots _N$ to implement the executable steps.

The resource management technique provides a smaller set of SLG controls that are direct and intuitive in nature, to allow the DBMS 100 to more accurately manage the workloads to improve the likelihood of meeting the SLGs of at least the most important workloads.

Figure 4:
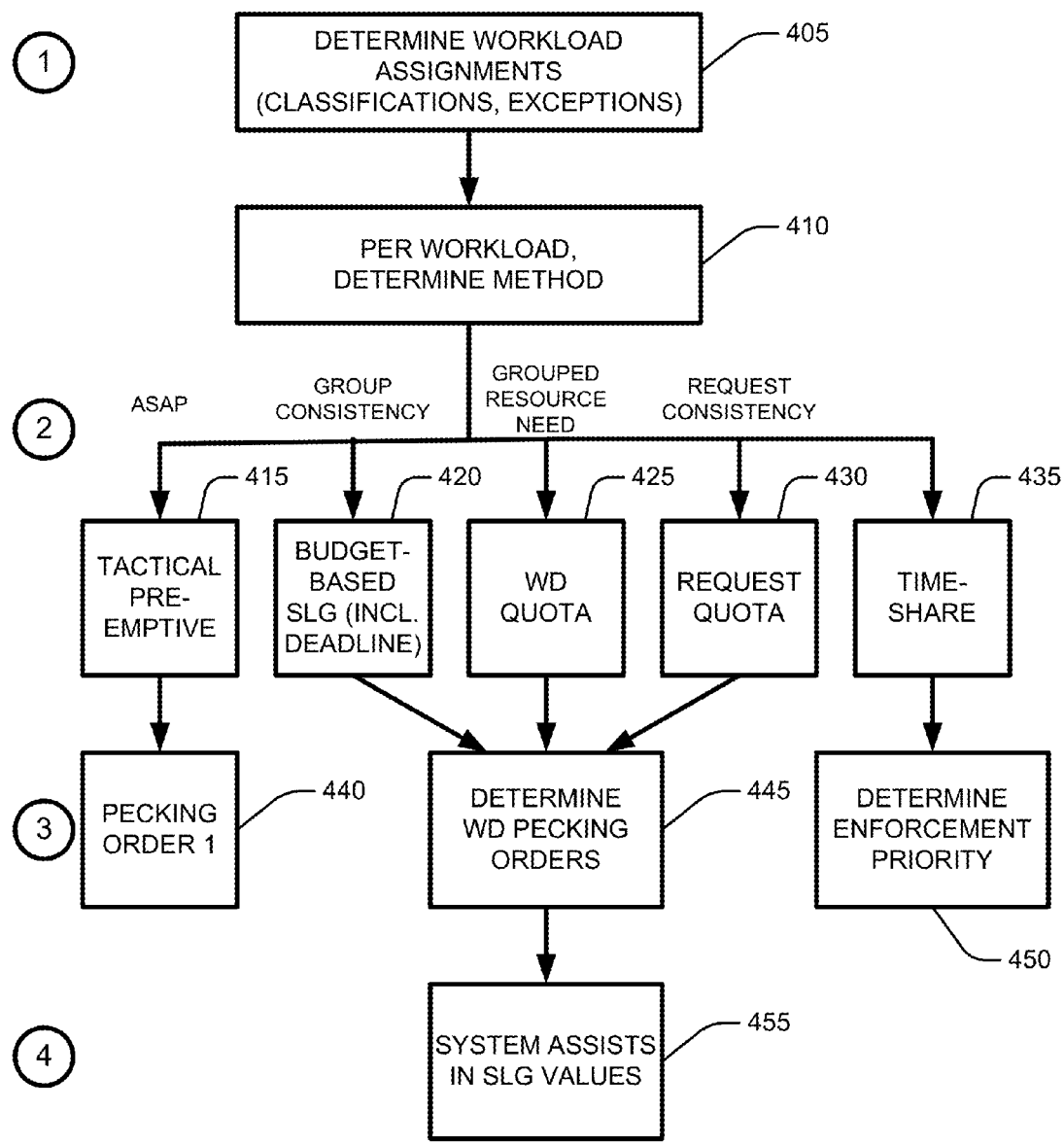
FIG. 4 is a block diagram of one embodiment of a system for determining the resource allocation technique to use for a query.

As illustrated in FIG. 4, the DBA's workload management set up for each workload will consist of 4 operations indicated by the circled numbers on the left side of FIG. 4:

Operation 1 (block 405): In one embodiment, workload classification and exception criteria are established to determine to which workload each query (or, more broadly, request—"request" include queries and other database operations, such as loads, updates, etc.) will belong. In one embodiment, this operation is performed by the DBA. In one embodiment, this operation is performed by the DBMS.

Operation 2 (block 410): In one embodiment, the resource allocation technique to be applied to each workload is selected. In one embodiment, this operation is performed by the DBA. In one embodiment, this operation is performed by the DBMS. In one embodiment, the resource allocation technique will be used to allocate one or more resources, such as a CPU, the CPUs in a node, the CPUs in the entire system, I/O, a network, memory, or other components (such as a satellite link).

In one embodiment, there are 5 different resource allocation techniques available, and for three of the five, an SLG directive is additionally required. In one embodiment, the five resource allocation techniques are (note that these techniques are described at the system level; it will be understood that the techniques could be applied at the node level as well):

1. Tactical Pre-Emptive, for requests that need to be serviced ASAP (block 415).
   a. An example is a critical call-center tactical request needing immediate response.
2. Budget-Based SLG, which is useful when all requests in the workload need to deliver the same consistent response time. (e.g.: finish all requests in 2 seconds, not 1 second, not 3 second) or to deliver the completed result at a deadline provided (block 420). Budget-Based SLG is described in the following co-pending applications, which are assigned to the assignee of the present application Ser. No. 12/317,836, filed Dec. 30, 2008, entitled "DATABASE SYSTEM HAVING A SERVICE LEVEL GOAL RESPONSIVE REGULATOR"; Ser. No. 12/317,985, filed Dec. 30, 2008, entitled "DATABASE SYSTEM HAVING A REGULATOR THAT PERFORMS WORKLOAD REGULATIONS BASED ON OPTIMIZER ESTIMATES"; and Ser. No. 12/482,780, filed Jun. 11, 2009, entitled "DATABASE SYSTEM HAVING A REGULATOR TO PROVIDE FEEDBACK STATISTICS TO A OPTIMIZER."
   a. Under this technique, interactive, medium-sized requests from the same workload all experience the same, consistent response time or completion time regardless of query variations or volume.
3. Workload Definition ("WD") Quota, for workloads where the combination of all issued requests in the workload is to be given a specified amount of system resources (block 425).
   a. An example is a campaign application that needs to achieve a certain amount of resources to complete the bulk of work required in a day. In one embodiment, tying performance to individual query response times is unreasonable as the work demanded is not based on individual requests, but the mix of work as a whole.
4. Request Quota, for workloads containing a heterogeneous (or homogeneous) mix of requests, which receive consistent resource allocation to yield a more consistent response time without punishing optimized queries and without rewarding poorly written ones (block 430).
   a. An example is interactive application where a satisfactory response time is defined by personal expectation rather than a specific response time value, and a variable response time has a more negative impact on customer satisfaction than when it is simply a long response time. For example, without request quota, if a request is submitted during peak utilization hours, it might complete with a very long response time but if it was instead submitted during the off-hours when the system is not heavily utilized, it might complete many times faster. Request Quota would apply a consistent level of resource allocation regardless of when the request was submitted to achieve response time consistency.

5. TimeShare, for all requests that do not have critical, pre-emptive performance needs, and therefore share remaining resources after other such work is satisfied.

Each resource allocation technique and its SLG directives is discussed in more depth below.

Operation 3: In one embodiment, the workloads are arranged into levels of a social hierarchy, or pecking order where the level assigned determines the degree of preferential access to resources. In one embodiment, the top pecking order is assigned automatically to any workloads using the Tactical Pre-Emptive method (block 440). In one embodiment, the bottom level is assigned automatically and collectively to all timeshare workloads. In one embodiment, the DBA manually assigns the pecking order level for all other workloads into one or more levels in between the top and bottom levels (block 445). In one embodiment, the DBMS automatically assigns the pecking order level for all other workloads into one or more levels in between the top and bottom levels (block 445).

In one embodiment, the pecking order level dictates and provides the preferential access only to the degree required to meet the WD's SLG directives. Then, in one embodiment, the remaining resources are allocated to the next highest pecking order WDs, and so forth until resources are exhausted (block 450). In one embodiment, meeting the SLG of higher pecking order WDs is potentially at the expense of all lower pecking order workloads and timeshare workloads. As such, the likelihood of a high pecking order workload meeting its SLG directives is better than a low-pecking-order workload meeting its SLG directives. In one embodiment, a small amount of resources is set aside and allocated to avoid starvation of any running requests regardless of how low they are in the pecking order. In one embodiment, the system does not allow low pecking order requests to indefinitely hold critical resources needed by higher pecking order requests.

Operation 4: In one embodiment (block 455), a software "advisor" within the database system assists the DBA in determining appropriate SLG directives for each workload. The purpose of the advisor is to minimize or even eliminate iterative tuning for workload management by guiding the DBA towards workload management settings that would deliver performance relative to existing performance and that meet the business need.

Pecking Order

In one embodiment, pecking order determines the order of preference that the DBMS give workloads. In one embodiment, workloads with the highest, most preferentially-treated, pecking orders will be most likely to meet their SLG directives first. In one embodiment, the system allocates resources first to the highest pecking order workload to the degree (or rate) required to meet its SLG directives. Then, in one embodiment, the remaining resources are allocated next to the next highest pecking order WDs, and so forth until resources are exhausted, even to the point that lower pecking order workloads are seemingly starved for resources. In one embodiment, starvation mechanisms prevent a "complete" starvation of any executing queries. As such, in one embodiment, the likelihood of a high pecking order workload meeting its SLG directives is greater than a low-pecking-order workload meeting its SLG directives.

Put another way, in one embodiment the pecking order tells the DBMS that, if it cannot meet all SLGs of WDs whose high pecking orders entitle them to resource starve or almost starve WDs with lower pecking orders (or "pre-empt" such WDs) (the higher pecking order WDs are called "Pre-Emptive Workloads," which are discussed below), the higher pecking order workloads will meet their service level goals at the expense of all lower pecking order workloads and timeshare workloads. If insufficient resources are available to service the highest pecking order workloads' SLGs, in one embodiment, then the highest pecking order workloads will all proportionally miss their service level goals to the same degree. Similarly, in one embodiment, if the DBMS can meet all of a higher pecking order's service level goals, but not all of the next pecking order's service level goals, the DBMS will proportionally miss all of the next pecking order's service level goals to the same degree.

In one embodiment, all Tactical Pre-Emptive workloads are fixed at the highest pecking order, and timeshare workloads are in essence fixed below all other pre-emptive workloads. In one embodiment, the DBA defines a pecking order for all other pre-emptive workloads. In one embodiment, the DBMS defines a pecking order for all other pre-emptive workloads. In one embodiment, there can be multiple workloads at each pecking order for easier management.

Managing for Changing Directives

In one embodiment, SLGs can change by Planned Environment. In one embodiment, Planned Environment is an element in a system state matrix that corresponds to an operating cycle or a business cycle. Examples of Planned Environments include week days versus weekends, night versus day, load application executing versus not executing. In one embodiment, changing a workload's SLG result in changes in the workload management behavior. In one embodiment, changing priority management weights, etc by state will no longer be necessary, but will be effectively automatic through the SLG change. In one embodiment, the need for Health Conditions, i.e., the state of health of system elements, to change workload management behaviors via "State Changes" is reduced dramatically, perhaps even eliminated through SLG-Responsive Workload Management. This is because, in one embodiment, the pecking order will naturally reduce resources provided to lower pecking order workloads in favor of higher pecking order workloads, which is the most typical set of actions the DBA sets up for a new state associated with a health condition event. Because of this shift of resources, in one embodiment, the lower pecking order workloads will be less likely to meet their SLGs during the period where the health condition persists. In one embodiment, that is typically the behavior sought by the DBA.

In one embodiment, pecking order can also change by Planned Environment. In one embodiment, Enforcement Priorities are also changed to allow different settings in one state vs another state.

Timeshare Resource Allocation Technique (Explanation of Block 435 on FIG. 4)

In one embodiment, Timeshare Workloads are distinct from all other workloads in the way pecking order is managed. In one embodiment, the other four resource allocation techniques (tactical pre-emptive, WD Quota, request quota or budget-based SLG) will pre-empt all lower-pecking-order workloads to satisfy the SLG of the particular workload. As such, these resource allocation techniques can be categorized as a group as "Pre-Emptive" techniques. Alternatively, in one embodiment, timeshare workloads, which are fixed at the lowest pecking order, share whatever is left after all pre-emptive workloads have taken what they need. In one embodiment, the DBMS divides up the remaining resources based on "deterministic fairness" mechanisms, as described below.

In one embodiment, each workload with a timeshare method selected will be associated with one of the following Enforcement Priorities:

Rush
Priority
Normal
Background

In one embodiment, Enforcement Priorities will only be required for Timeshare workloads. Further, in one embodiment, a previous Enforcement Priority, called "Tactical," Enforcement Priority will be eliminated as any workload with that Enforcement Priority will be migrated to utilize the "Tactical Pre-Emptive" resource allocation technique described below. Thus, in one embodiment, there are three Enforcement Priority Options: Priority, Normal and Background, plus a fourth Enforcement Priority called "Rush," as shown above. In one embodiment, there are additional Enforcement Priorities, providing additional flexibility but potentially adding complexity to the task of assigning Enforcement Priorities. In one embodiment, additional Enforcement Priorities can be added by, for example, the DBA. For example, in one embodiment, a new Enforcement Priority, called "Super Rush," can be added that has greater priority than the "Rush" Enforcement Priority. In addition, in one embodiment, a DBA can add interstitial Enforcement Priorities, between those listed above. For example, a DBA might add a "Special Customer" Enforcement Priority between Rush and Priority.

In one embodiment, each Enforcement Priority will have a fixed association with a resource access rate that the DBMS will utilize. In one embodiment, the DBA does not have the ability to adjust that access rate. In one embodiment, the access rates will be adjustable, for example during testing, debugging and troubleshooting phases. In one embodiment, all means for adjusting the access rates are internalized and not accessible by the DBA for adjustment.

In one embodiment, the resource access rate to Enforcement Priority mappings are:

Rush→4
Priority→3
Normal→2
Background→1

It will be understood that the mappings can be different from those shown above. For example, in one embodiment, rather than mappings following a line with a slope of 1 as shown above (i.e., 4, 3, 2, 1), the mappings might follow a line with a greater slope (i.e., a slope of 2 resulting in mappings of 8, 4, 2, 1), exponential (i.e., 16, 8, 4, 2), or "random" (i.e., 36, 25, 12, 1). In one embodiment, the mappings can be adjusted on the fly by the DBA. In one embodiment, the mappings adjust automatically depending on, for example, the time of day or the load on the DBMS or the system.

The "deterministic fairness" techniques operate as described below.

Figure 5:
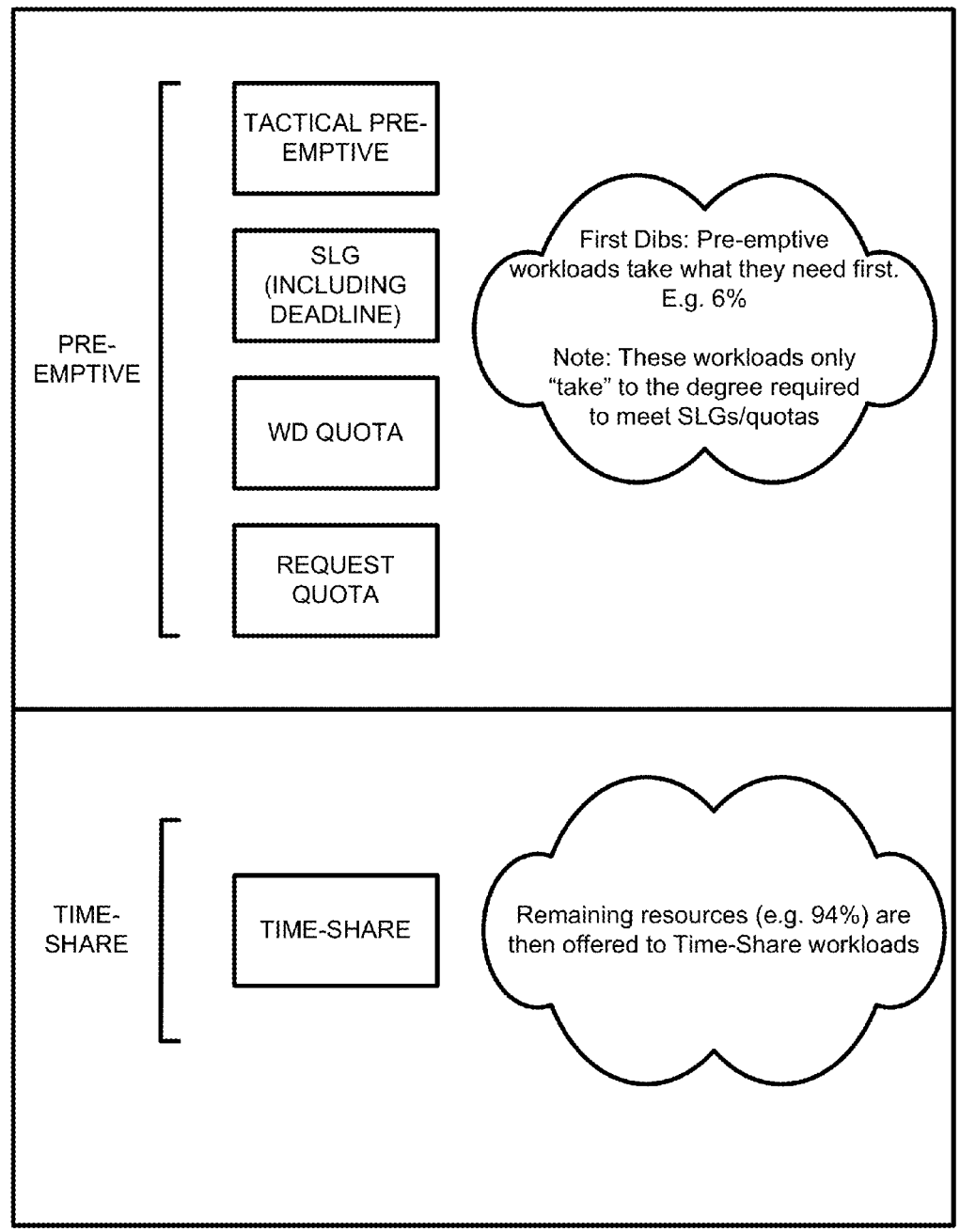
FIG. 5 illustrates one embodiment of the relationship between pre-emptive and timeshare workloads.
Figure 6:
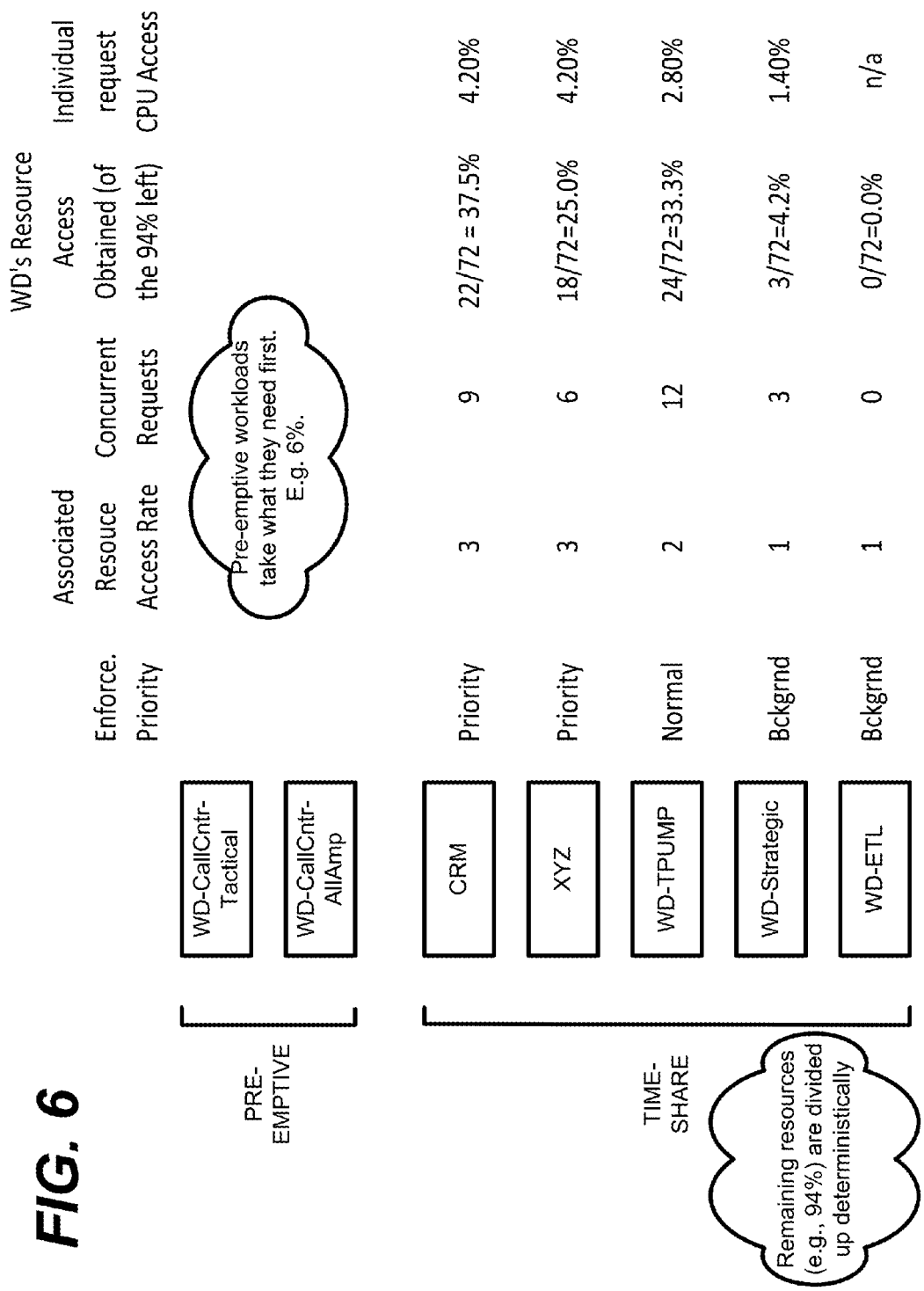
FIG. 6 is a chart illustrating one embodiment of the division of resource allocation parts among time-share workloads.

In one embodiment, each individual request classified under a timeshare workload receives access to the remaining resources, after pre-emptive workloads have taken what they need, according to its Enforcement Priority. For example, consider the example illustrated in FIGS. 5 and 6. Five time-share workloads share 94% of a resource, which is the amount remaining after the two pre-emptive workloads take what they need. In one embodiment, resources are delegated on a node-by-node basis, in which case references to resource delegation are on the node level.

In one embodiment, the deterministic fairness technique provides understandable, well-behaved performance for individual requests regardless of the amount of competing work, assuming competing work is not holding needed resources via, for example, locks. As such, assuming that there are requests assigned to each of the timeshare categories in the example shown in FIG. 6, individual priority requests will always get three times the resource access rate as a background request, and normal requests will always get two times the resource access rate as an individual background request, based on the resource access rate described earlier. In the example shown in FIG. 6, amongst the five timeshare workloads, there are 30 individual requests executing (determined by summing the "Concurrent Requests" column), divided by workload. If, in one embodiment, one or more of the timeshare categories has no requests assigned to it, these numbers would change. For example, suppose 10 queries are running in a background WD and no requests are running in any of the other (rush, priority, or normal) WDs, the 10 queries running in the background WDs would each be allocated $1/10^{th}$ of the resource.

In one embodiment, to determine the total units to divide the remaining time into (i.e., the "deterministic unit"), each request is multiplied by its associated resource access rate, and all sums are totaled:

CRM: 9*3=27
XYZ: 6*3=18
TPump: 12*2=24
Strategic: 3*1=3
ETL: 0*1=0
27+18+24+3=72→Each deterministic unit is 1/72 of remaining resources (94%).
  Priority Requests get 3/72 of remains=4.2%*94%=3.9%
  Normal Requests get 2/72 of remains=2.8%*94%=2.6%
  Background Requests get 1/72 of remains=1.4%*94%=1.3%

In one embodiment, in a subsequent period of time, the deterministic unit is recalculated based on current parameters such as remaining resources, concurrent requests at each deterministic level, etc. For example, in a busier system with the same timeshare mix, there may only be 20% remaining resources,
  Priority Requests get 3/72 of remains=4.2%*20%=0.83%
  Normal Requests get 2/72 of remains=2.8%*20%=0.56%
  Background Requests get 1/72 of remains=1.4%*20%=0.28%

In another example, in the busier system with a smaller time-share mix where there are only 12 deterministic units:
  Priority Requests get 3/12 of remains=25%*20%=5.0%
  Normal Requests get 2/12 of remains=16.6%*20%=3.4%
  Background Requests get 1/12 of remains=8.3%*20%=1.7%

Figure 7:
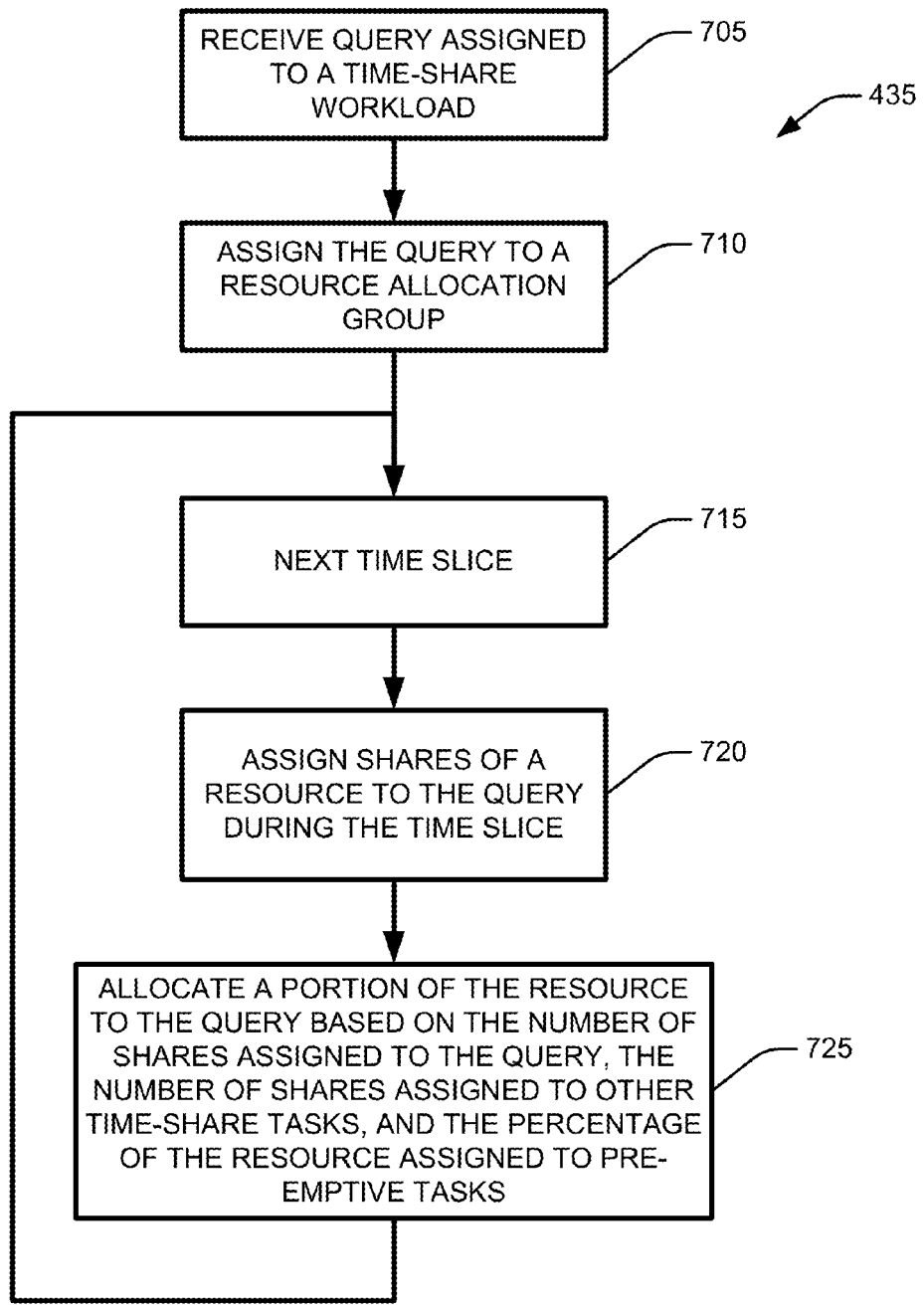
FIG. 7 is a block diagram of one embodiment of the time-share resource allocation technique.

In one embodiment of the operation of the time-share technique for a single resource (it will be understood that the same technique can be applied to more than one resource), as shown in FIG. 7, the DBMS receives a query that is assigned to a time-share WD (block 705). In one embodiment, the DBMS has previously assigned the time-share WD to one of N resource allocation groups, RAG1 ... RAGN. A resource allocation group, or RAG, is a group of WDs (and the requests that are assigned to those WDs) that are treated as a group for the purposes of allocating resources (note that RAGs are an abstract concept used in this application that are to be distinguished from the "Allocation Group" of the Priority Scheduler of the Teradata Corporation DBMS). Therefore, in one embodiment, assigning the request to a time-share WD causes the request to be assigned to a resource allocation group (block 710). In one embodiment, each resource allocation group corresponds to an Enforcement Priority. For example, RAG1 may correspond to Enforcement Priority 1, RAG2 to Enforcement Priority 2, RAG3 to Enforcement Priority 3, and RAG4 to Enforcement Priority 4.

Figure 8:
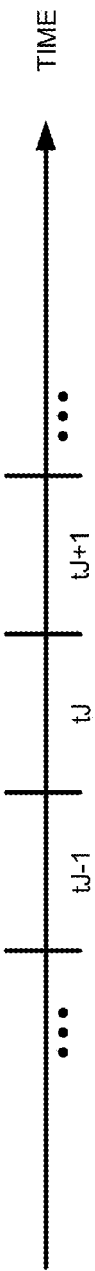
FIG. 8 illustrates one embodiment of the concept of time slices.

In one embodiment, time is divided into time slices as shown in FIG. 8, where a time slice (e.g., time slice tJ−1, tJ, or tJ+1, etc.) is a short, defined period of time, such as for example, the 1 second interval from 1:00:00 am until 1:00:01 am on Jun. 1, 2010. In one embodiment, time slices can be any length and can be much shorter or much longer that 1 second. For example, a time slice can be 1 millisecond or 60 seconds. Further, while the time slices in FIG. 8 are shown as being of uniform length, in one embodiment the time slices can be of different lengths (i.e., the length of time slice tJ may not necessarily equal the length of another time slice, such as time slice 0+1). In one embodiment, resource assignment is reconsidered for each new time slice. Thus, referring back to FIG. 7, the time-share technique continues by moving to the next time slice tJ (block 715).

In one embodiment, for the purposes of this application, a resource can be allocated among tasks in parts, referred to herein as "allocation parts" or "APs." In one embodiment, the number of allocation parts associated with a resource depends on how many consumers (e.g., WDs) exist for that resource. For example, if there are two consumers for a resource and their claim to the resource is equal then two allocation parts (one for each consumer) may be sufficient. In one embodiment, if there are ten consumers and their claims on the resource (in terms of pecking order and SLG) are not all the same, then it may take more than 10 allocation parts to allocate the resource.

Further, in one embodiment, not all of a given resource is available for allocation at all times. For example, in one embodiment, a resource may be under repair, partially reserved for some other use, or otherwise partially unavailable. In one embodiment, in such circumstances, the allocation parts refer to parts of the resource that are available for allocation at that time.

Further, in one embodiment the number of allocation parts for a resource may vary from one time slice to another. For example, in a first time slice, a resource may require 10 allocation parts and in another time slice, the resource may require 50 allocation parts.

In one embodiment, allocation parts of the resource are assigned for time slice tJ to a task according to the following table (block 715):

| Resource allocation group | Number of allocation parts of resource (equivalent to "Associated Resource Access Rate" in FIG. 6) |
| --- | --- |
| RAG1 | AP1J |
| RAG2 | AP2J |
| ... | ... |
| RAGN | APNJ | where:
AP1J is the number of allocation parts of the resource assigned to individual resource allocation group RAG1 tasks during time slice tJ;
AP2J is the number of allocation parts of the resource assigned to individual resource allocation group RAG2 tasks during time slice tJ;
APNJ is the number of allocation parts of the resource assigned to individual resource allocation group RAGN tasks during time slice tJ;
time slice tJ is the Jth period of time in an overall period of time during which the resource is being allocated; and
not all of AP1J, AP2J, . . . APNJ are equal.

Assume that the query is assigned to resource allocation group RAG2. In that case, referring to the table above, AP2J allocation parts of the resource to the query during the time slice tJ (block 720). In another time slice (e.g., time slice tJ+1) the number of allocation parts assigned to RAG2 may be different.

The computer may be performing one or more pre-emptive tasks that are consuming a pre-emptive percentage of the resource and one or more timeshare tasks that have been allocated APtasksJ allocation parts of the resource during time slice J. In that case, in one embodiment, the percentage of the resource assigned to the query during time slice J is calculated by dividing the APMJ by APMJ+APtasksJ and multiplying the result by (available percentage−pre-emptive percentage)(block 725), where "available percentage" is the percentage of the resource available for allocation (in one embodiment, the "available percentage" is 100 percent; in one embodiment, the "available percentage" is less than 100 percent). This calculation is illustrated above in the discussion of FIG. 6.

When time slice tJ comes to an end, the process returns to block 715.

Decay Option on Timeshare Workloads

The decay option on timeshare workloads technique provides an option to decay the relative resource access rate of the timeshare requests over the life of the request.

Figure 9:
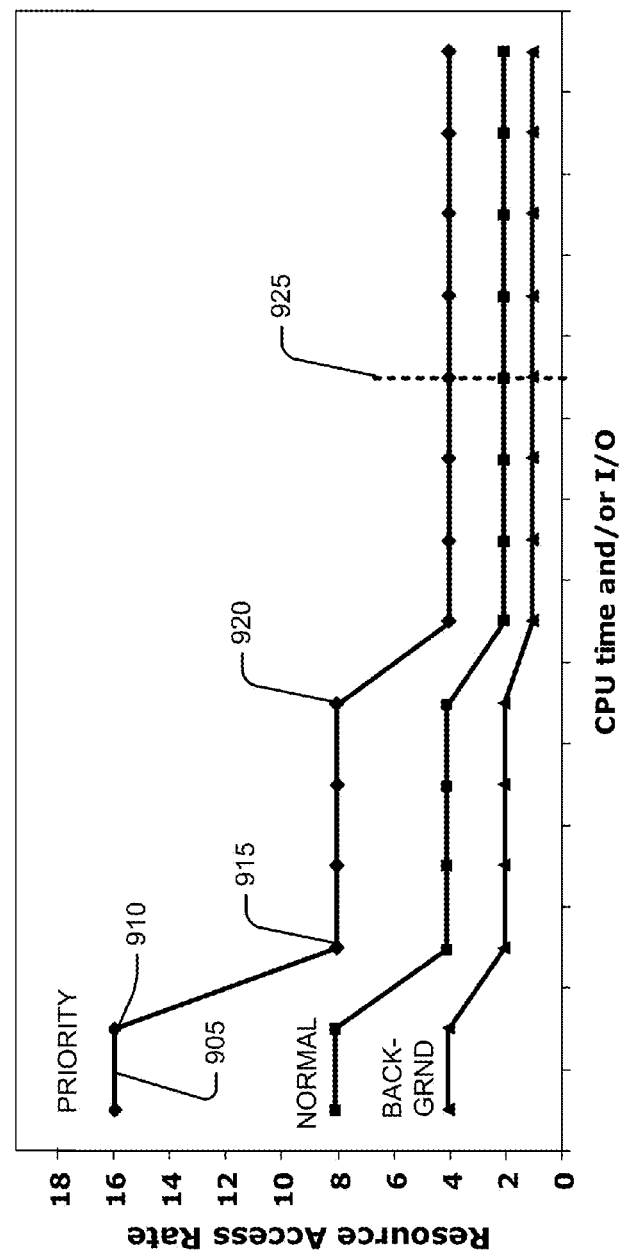
FIG. 9 illustrates one embodiment of the decay option for time-share workloads.

In one embodiment, illustrated in FIG. 9, the decay technique operates as follows:
The request begins with the designated resource access rate assigned to its
Enforcement Priority. Using the "Priority" Enforcement Policy shown in FIG. 9, the request is assigned a resource allocation of "16" (e.g., 16 allocation parts).
After a very small amount of CPU and I/O resources have been applied to the request (e.g., 200 ms, represented by time period 905 in FIG. 9), the request's resource access rate is decayed by an amount, e.g., ½. In FIG. 9, the request's resource access rate is dropped to 8 (or half of 16). In one embodiment, illustrated in FIG. 9, the resource access rate is reduced gradually over a period of time (i.e., from time point 910 to time point 915). In one embodiment, the reduction of the actual number of allocation parts of a resource assigned to the request lags the reduction in the resource access rate. In one embodiment, the resource access rate is dropped instantaneously (i.e., from 16 to 8 at time point 910) even though the actual number of allocation parts of the resource or resources assigned to the request may take more time to reduce.
In one embodiment, after additional resources have been applied to the request (e.g., 2 seconds or at time point 920 in FIG. 9), the request's resource access rate is decayed further by an amount, e.g., ½ again. In one embodiment, the resource access rate remains constant for the remaining duration of the query execution, or until an exception occurs that reclassifies a request to another workload, whereby it adopts the workload management method of the new workload (note that the occurrence of an exception causing a reclassification to another workload can occur at any point along the FIG. 9 timeline, not just at point 920 and beyond). In one embodiment, the resource access rate iteratively increases the decay as described above, on a periodic or non-periodic basis.

In one embodiment, the decay actions are logged in a Database Query Log ("DBQL") to facilitate data mining of the workloads, for example, to determine what percentage of requests in a workload operated in the highest resource access rate, and which operated in lower resource access rates.

In one embodiment, if an exception occurs that moves the request from one timeshare Enforcement Priority to another timeshare Enforcement Priority, the request adopts the resource access rate of the new Enforcement Priority appropriate to the amount of resources consumed thus far. For example, assume a request began in the "Priority" Enforcement Policy, and had consumed x resources causing it to be decayed down to the third level (i.e., "4" in FIG. 9). Then assume an exception occurs to take the request to "Background" (e.g., at time 925 in FIG. 9). In one embodiment, the request will commence executing at the background decay level appropriate for a query that has already consumed x resources (e.g., at "1" in FIG. 9). That is, in one embodiment, it is as if the request started in the background WD and experienced its decays while in background and was never routed first to Priority.

In one embodiment, the resource access rate decay option can occur at the workload level and/or at the system level. In one embodiment, when enabled at the system level, resource access rate decay applies only to requests classified into timeshare workloads. In one embodiment, when enabled at the workload level, resource access rate decay would only apply to requests classified into the chosen timeshare workload. In one embodiment, resource access rate decay is elected only for workloads utilizing the timeshare method of management.

In one embodiment, the resource access decay option is applied only at the system level for uniform timeshare behavior, and not applied individually at the workload level, to preserve some degree of priority. For example, if a Priority request is decayed to $1/4^{th}$ its original resource access rate, but a background request did not decay, the background request might receive a higher resource access rate than the decayed priority request. Most DBMS customers would consider this 'undesirable behavior'. In one embodiment, this option is not exposed at the workload level. In one embodiment, the DBA has the ability to disable or hide this option.

Figure 10:
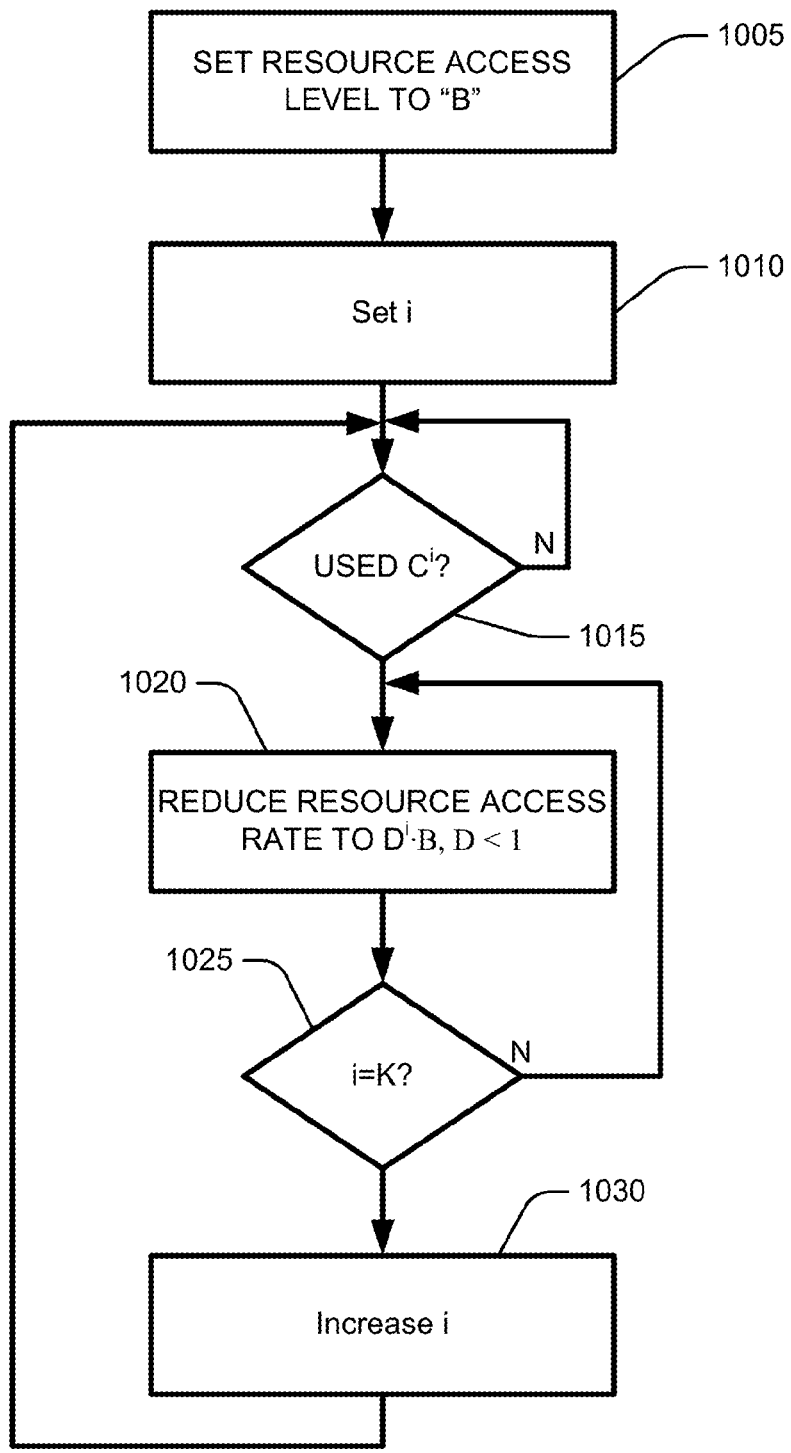
FIG. 10 is a flow chart of the decay option.

In one embodiment, the resource access rate decay option operates as illustrated in FIG. 10. In one embodiment, execution of the query begins with the resource at a first resource access level B (block 1005). In one embodiment, B is set according to the WD to which the query is assigned. In one embodiment, an index i is set at a set amount (block 1010), e.g., at 1. In one embodiment, the following is then repeated for a total of K iterations: after use of $C^i$ computer resources (block 1015) the resource access rate is reduced to $D^i \cdot B$, where D<1 (block 1020). If i is not equal to K (block 1025), i is increased (block 1030), e.g., by 1, and processing returns to block 1015. In one embodiment, C, D, the initial value of i and the amount that i increments for each iteration may be set by a DBA. In one embodiment, C, D, the initial value of i and the amount that i increments for each iteration are automatically varied by the system depending on the DBMS load and/or system load.

In one embodiment, the query is denoted Q1 and a second query Q2 is executing on the DBMS. Q2 has a lower priority than Q1. In one embodiment, Q1 after a executing for a period of L seconds will have more resource use rate than Q2 after a period of L seconds.

In one embodiment, the resource access rate access decay option is effectively stopped by increasing C. In one embodiment, the resource access rate decay option may be disabled by action of a DBA (e.g., by setting C to a high value).

Tactical Pre-Emptive Method of Workload Management (Explanation of Block 415 on FIG. 4)

In one embodiment, a "Tactical Pre-Emptive" workload management technique is provided (i.e., block 415). In one embodiment, requests classified to one of these workloads will pre-empt all timeshare and all other pre-emptive methods (WD Quota, Request Quota and Budget-Based SLG workloads).

In one embodiment, all Tactical Pre-Emptive workloads share the topmost pecking order, and as such, obtain first dibs on resources. In one embodiment, unlike the other three pre-emptive workload management techniques, this technique has no limitations on the resources it takes. Its goal is to finish its processing ASAP, with the only real competition for resources being other Tactical Pre-emptive requests.

In one embodiment, a Tactical Pre-Emptive workload has:
a real-time attribute, that identifies it as Tactical Pre-Emptive workload;
an SLG; and
a pecking order.

In one embodiment, the SLG tells the DBMS when requests assigned to the workload need to complete. The pecking order tells the DBMS that, if it cannot meet the SLGs of all Tactical Pre-Emptive workloads, the DBMS will give priority to the Tactical Pre-Emptive workloads with the higher pecking orders. In one embodiment, if there are two or more Tactical Pre-Emptive workloads with the same pecking orders and there are not enough resources to meet the SLGs of all of those workloads, then the DBMS will allocate resources to those workloads so that they will all miss their SLGs by a proportional amount.

In one embodiment, "failsafe" methods are employed in case the classification procedures fail to limit which requests can execute under Tactical Pre-emptive workloads. In one embodiment, this is done by defining an appropriate exception on the workload so that any violators detected can be removed from the Tactical Pre-emptive WDs, thereby stopping those requests from continuing to have limitless access to resources. In one embodiment, this removal is done automatically at a pre-defined failsafe threshold. In one embodiment, this removal is done automatically at a DBA-defined failsafe threshold. In one embodiment, the removal is done only on approval of a DBA.

Expedited Work

Some existing systems include an Allocation Group setting that indicates that the Allocation Group is expected to process expedited work. In one embodiment, these work requests receive special treatment. They receive superior priority in the input queue, bypassing normal requests, and are assigned to work processes from a pool of reserved processes for the purpose.

With the Tactical Pre-Emptive technique, the expedited work setting will remain and will by default be applied to all requests associated with the Tactical Pre-Emptive technique. In one embodiment, this work will utilize the reserved work task process pool.

WD Quota Method of Workload Management (Explanation of Block 425 on FIG. 4)

In some existing DBMS s, DBAs give top resources (weightings) first to high and tactical priority, response-time sensitive work, then attempt to give sufficient resources to non-response-time-sensitive work to meet their business needs. A typical approach is to iterate and fine-tune allocation group ("AG"—these are different from resource allocation groups discussed above) weights and concurrency throttles until a particular workload's prevailing CPU consumption matches that viewed as sufficient to meet business needs, while not impacting negatively the response-time-sensitive work. Two examples of non-response-time-sensitive work are: (1) A data transformation and loading and/or value added processing job as a unit needs to complete in time for morning processing; and (2) A sufficient volume of requests need to complete every day to reach the appropriate business value. For this non-response-time sensitive (but still important) work, DBAs monitor a workload's CPU consumption and then cross-reference it to business satisfaction levels. They essentially can identify the workload CPU consumption level that reaches business satisfaction. Then the trick is to fine-tune all AG weights and concurrency throttles to yield not only that CPU consumption level, but to not penalize response time-sensitive work, or other important work besides this workload. This current method can be coined "Fuzzy" Quota Management, because it is unlikely to deliver a precise and accurate quota. A change in the dynamics of the competing workloads at any given point in time from "the typical mix" could easily throw-off the ability for the weights and concurrency settings to meet the fuzzy quota. Further, for Fuzzy Quota Management on selected workloads to function as the DBA intends, it requires the existing, non-deterministic behavior of the Priority Scheduler, while at the same time preferring deterministic behavior for other workloads.

In one embodiment, a WD Quota technique for resource allocation is provided, in which a specified quota of system resources is shared by all concurrent requests issued to that WD.

Some of the benefits of the WD Quota technique are:
1) it allows precise and accurate resource quota management for the workload,
2) it is compatible with other workloads requiring different methods of management, such as ASAP for tactical, or deterministic for timeshare work.
3) Ease-of-Use: It eliminates the iterative fine-tuning of weights and replaces it with a direct WD Quota directive that is managed to success in line with its pecking order.

Figure 11:
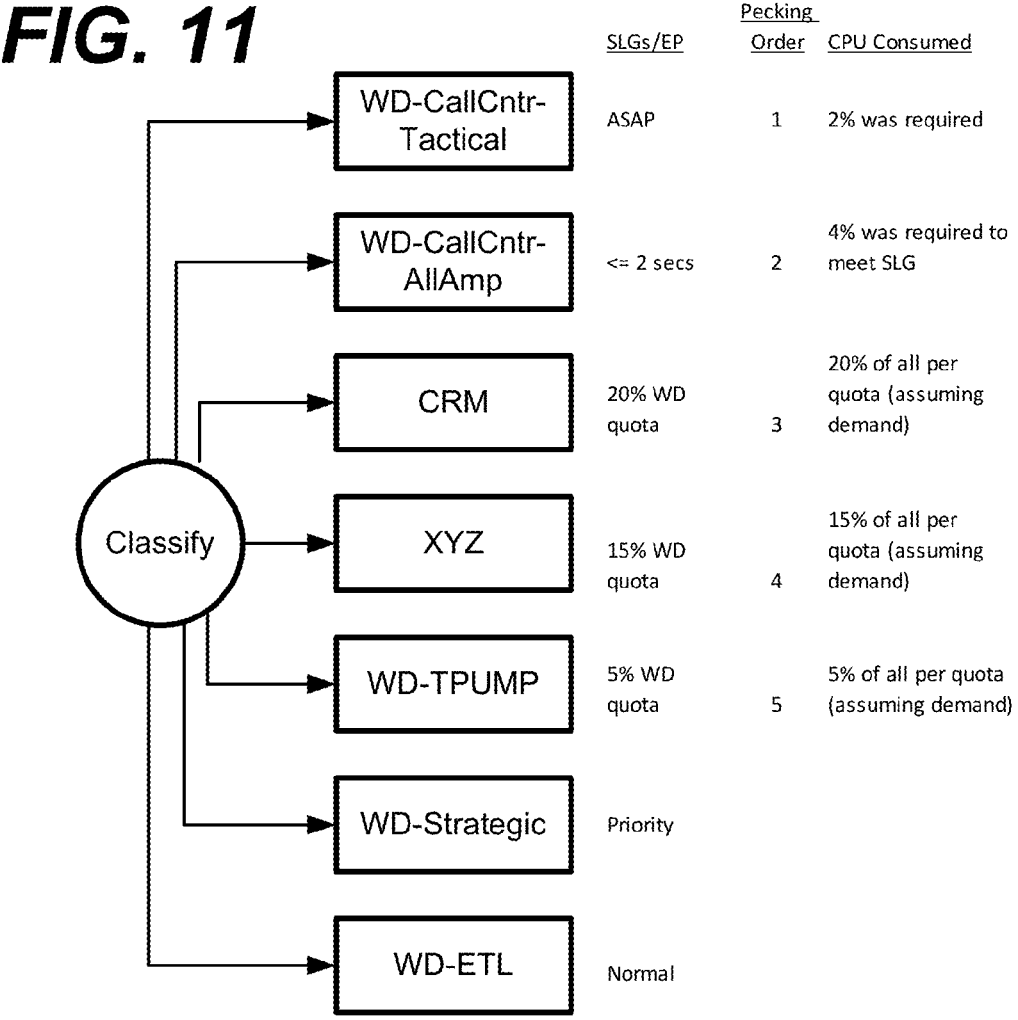
FIGS. 11 and 12 illustrate one embodiment of the WD Quota resource allocation technique.
Figure 12:
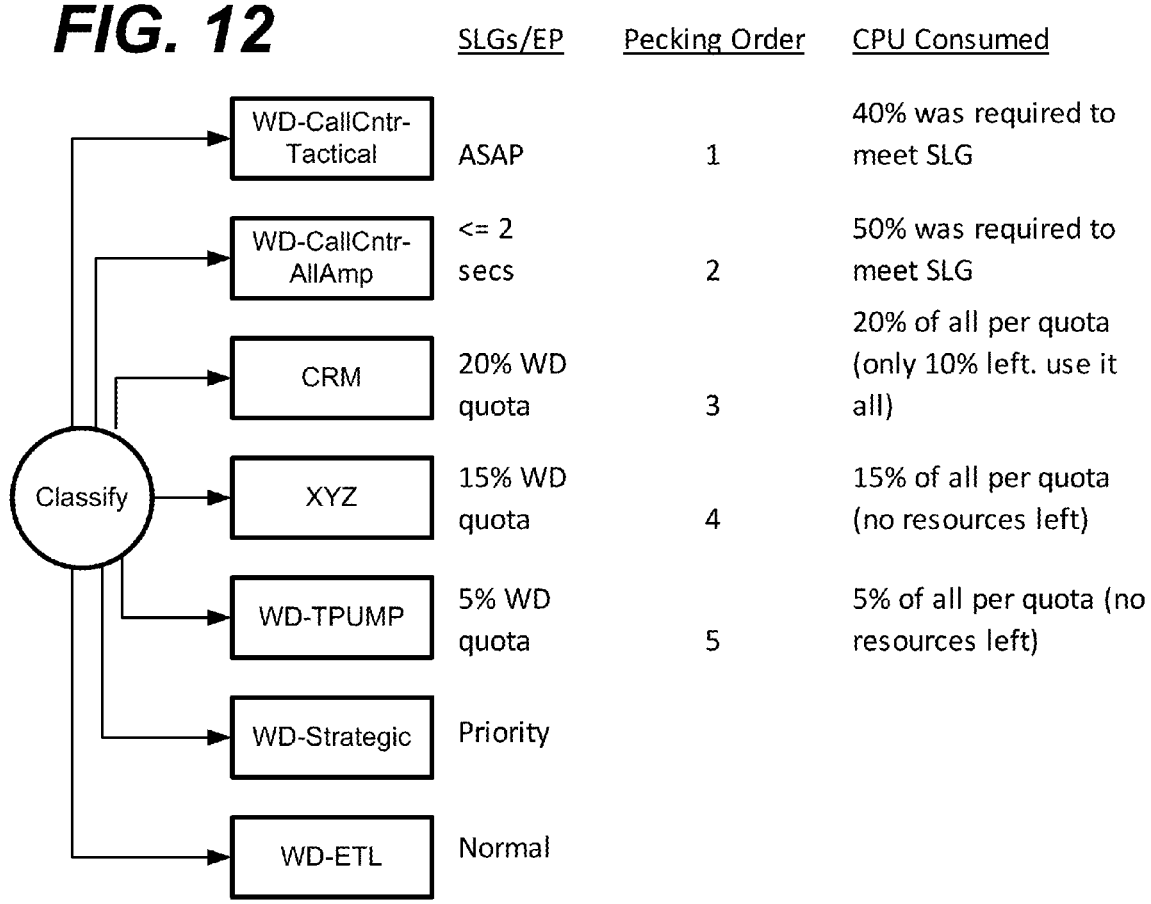

An example of a workload designated with the WD Quota technique of resource management is shown in FIGS. 11 and 12. Two non-response-time-sensitive workloads CRM and XYZ both use this technique, specifying 20% and 15% of system resources respectively as their Quota SLG. They will successfully realize that Quota SLG based on their pecking order. In FIG. 11, workloads at a higher pecking order only required 6% of the system, leaving sufficient resources available to service both CRM and XYZ quotas completely. In FIG. 12, higher pecking order workloads required 90% of the resources, leaving only 10% for all lower-pecking order work. CRM, at higher pecking order consumes this entirely, but is still unable to meet its full Quota SLG of 20%. XYZ's Quota SLG is not satisfied at all due to its lower pecking order.

Figure 13:
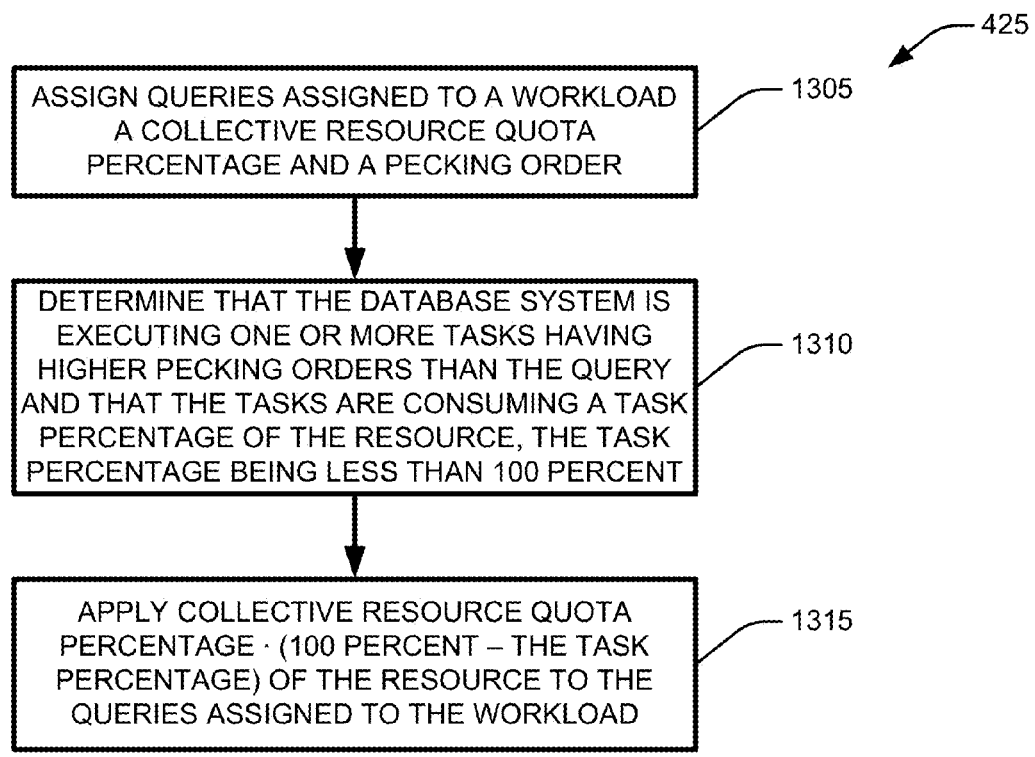
FIG. 13 is a flow chart of one embodiment of the WD Quota resource allocation technique.

In one embodiment of its operation, as shown in FIG. 13, the WD Quota technique of resource management assigns queries assigned to a workload a collective resource quota percentage and a pecking order (block 1305). Upon determining that the database system is executing one or more tasks having higher pecking orders than the query and that the tasks are consuming a task percentage of the resource, the task percentage being less than the available percentage (block 1310), the DBMS applies collective resource quota percentage·(available percentage–the task percentage) of the resource to the queries assigned to the workload (block 1315).

WD Quota SLG Specifications

In one embodiment, the resource quota specification is a target. In one embodiment, a maximum/cap is specified.

In one embodiment, assignment of the full target is subject to higher pecking order needs, as illustrated in the discussion of FIGS. 11 and 12.

In one embodiment, anything over the target, up to the optional maximum/cap is delegated only if there would otherwise be idle resources after all other lower pecking order and timeshare demand is met.

In one embodiment, any extra resources are fairly distributed when more than one WD wants to tap into the idle resources via a "maximum/cap" specification. For example, if there are 10% of resources left, and two workloads have a higher maximum/cap specification allowing them to tap into those unused resources, each workload will get the additional resources in proportion to their target quota. In the example above (CRM target of 20%, XYZ target of 15%), CRM would get 5.7% of the remaining 10% ((20/(20+15))*10%), while XYZ would get the remaining 4.3% ((15/(20+15))*10%).

In one embodiment, a "progressive" uplift algorithm to favor a higher pecking order's portion of the extra resources is used, rather than a strict across-the-board equal portion of the extra resources. For example, in one embodiment using the example above, where CRM has a higher pecking order greater than that of XYZ by 1, each progressively-higher pecking order would be allowed a 50% bonus over the next lower-pecking order. So, CRM would get 6.7% to XYZ's 3.3% (CRM_portion+XYZ_portion=10%; XYZ_portion=50 percent of CRM_portion). In other embodiments, a bonus other than 50% is used.

Logging & Log Analysis

In one embodiment, it will be a common occurrence for a workload not to demand its target quota, allowing its quota to be redistributed for use by other workloads based on pecking order. In an environment where this "sharing" of resources is acceptable, even desirable, the metrics to evaluate success in management are complicated by this lack of workload demand. Therefore, in one embodiment, the DBMS logs (for future analysis and trending) both the resource consumption and demand by workload.

Option to Apply Rolling Average to WD Quotas

Often the business's ultimate quota management goal is to manage a workload's quota on an hourly or daily basis, without concern for momentary low or high-usage. As such, the business desires the opportunity to make up for low-usage moments by over-consuming for a time. Those low-usage moments can be due to either low pecking-order issues, or under-demand.

Figure 14:
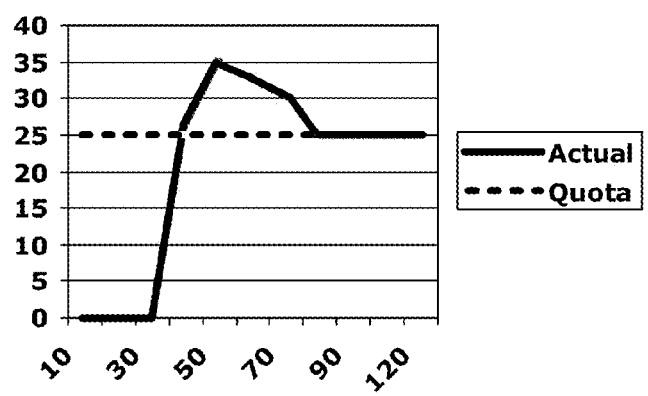
FIG. 14 illustrates one embodiment of the option to apply rolling averages to WD Quota workloads.

Therefore, in one embodiment, an option, illustrated in FIG. 14, can be selected for WD Quotas to manage based on a Rolling Average whose duration is, in one embodiment, of the DBA's choosing. In one embodiment, the DBMS manages the rolling average and derives the resultant "quota for the moment" via control theory techniques. In one embodiment, the DBMS uses a revised quota for its management at appropriate intervals.

In one embodiment, the rolling average is determined by averaging the resource percentage allocated to, for example, all WDs with priorities higher than the priority assigned to the WD Quota WDs over a window of time, the length of the window being adjustable by the DBA. The adjustment to the quota assigned to a WD Quota WD is periodically increased if the rolling average decreases and decreased if the rolling average increases.

Request Quota Technique of Workload Management (Explanation of Block 430 on FIG. 4)

In one embodiment, each request classified within a Request Quota WD is given the same fixed percent of resources as designated by the DBA. To give a specific example of this embodiment of the Request Quota technique, a Workload ABC may be defined so that all requests issued within Workload ABC operate at a rate of 2% utilization.

In one embodiment, the key behavior realized with this method is more consistent response times. This business need stems from the costs and benefits of their end-user satisfaction levels. As end-users grow accustomed to a particular responsiveness, whether slow or fast, the expected performance satisfies them as long as it is consistent. On the other hand, highly variable response times often lead to low satisfaction, even when the response times are relatively fast.

To better understand this, consider an often-observed methodology employed by database DBAs utilizing an existing DBMS workload management system (i.e., a DBMS that does not practice the techniques described herein). In such environments when a system is upgraded, the DBA may be given a goal to not allow the end-users to experience faster response times as a result of the upgrade. As the system usage grows into the new system size, the DBA is to avoid having the end-users perceive poor performance when in fact the performance is exactly at the levels it was before the upgrade. The DBA then proceeds to iteratively fine-tune the DBMS for the target workload and those workloads that tend to impact the target workload the most, until the result yields response times that are in the same response time as before the upgrade. But the response time variance is still subject to the normal workload mix variations. However, the DBA must be satisfied to simply achieve this fuzzy degree of consistency based on averages or percentiles rather than a true measure of consistency based on low standard deviations. Some existing DBMS s depend on "a typical mixed load" to help deliver the desired response times to the requests in the target workload, in addition to the other fine-tuning knobs in the DBA's control.

One common tuning option employed in the above situation is to adjust the System CPU limit, where, in order to achieve response time consistency for a particular workload, a system CPU limit is imposed that leaves a percentage of the system unused, off limits to all workloads. As the business grows into its new system capacity, the system CPU limit is slowly adjusted over time until it is completely eliminated at the point where it is deemed that the business has grown into its capacity. The downside to this approach is the lost access to the system for other workloads where consistent response times are not an issue.

Under one embodiment of the Request Quota technique, the DBA defines the SLG for a certain workload directly as a request-level quota. In one embodiment, the iterative tuning of system CPU limits, Allocation Group weights and concurrency levels is unnecessary, and the quota the DBA assigned would be a direct reflection of the business's need for response time consistency to selected workloads. Further, in one embodiment, the DBMS would be able to manage to that quota, dynamically adjusting as necessary as the competing mixed load constantly changes, rather than managing to a set of system CPU limits, Allocation Group weights and concurrency limits.

Further, with the budget-based SLG management method, a 2 second response time SLG may work well for a workload with very similar queries that get classified into it (for example, all the same type of simple, repetitive, high-volume tactical query). But it becomes unreasonable for workloads that are very heterogeneous in nature, e.g., where queries issued can be very short or very long. The Request Quota technique does not require a homogeneous mix of queries to be classified to it. All queries, whether short or very long, will be given the same quota percent of resources and as a result, will be able to deliver more consistent response times at the query level, i.e., whenever a particular query is issued.

Figure 15:
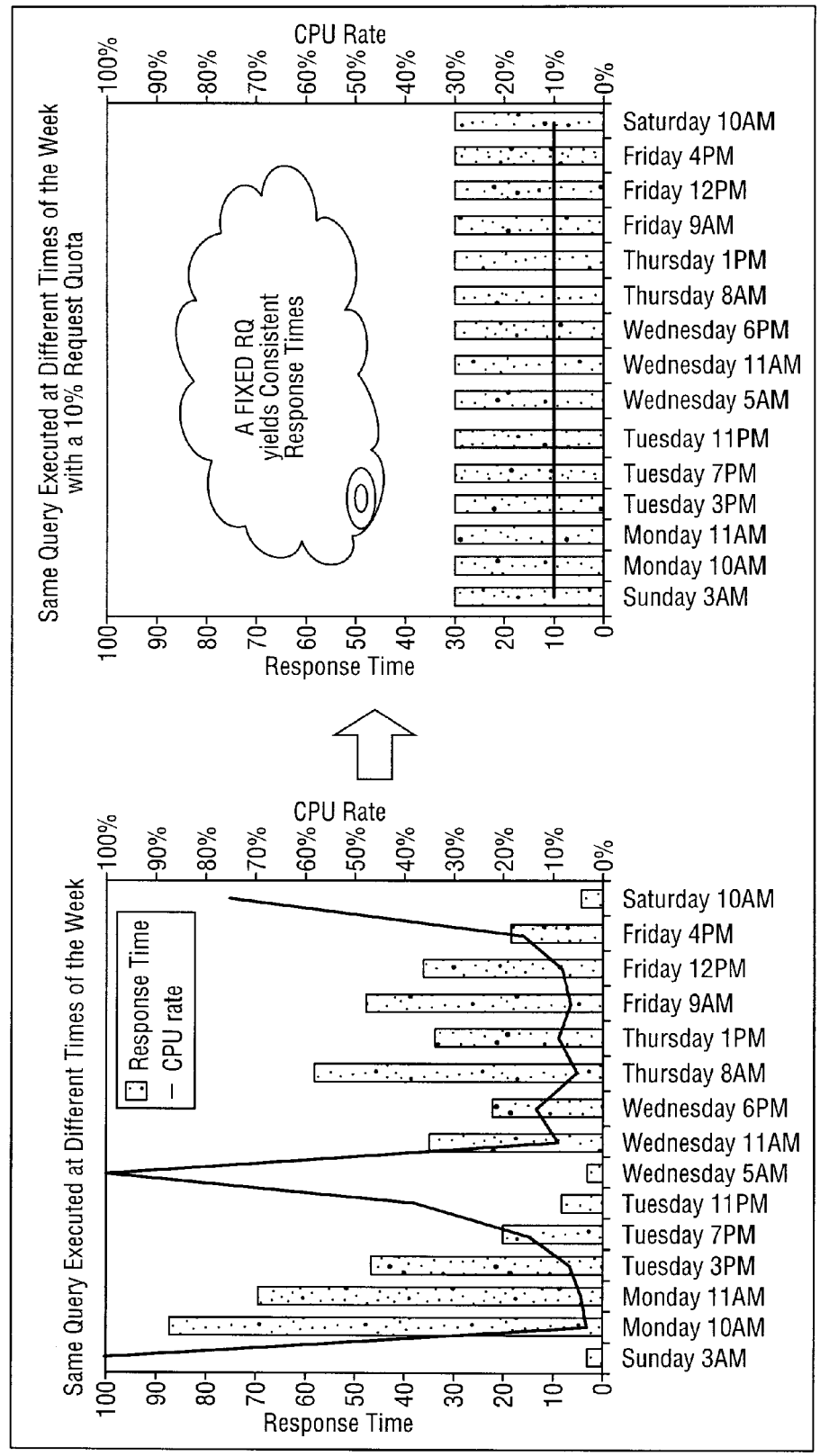
FIGS. 15A, 15B, and 16 illustrate one embodiment of the Request Quota resource allocation technique.

The Request Quota technique can be analogized to the basic law of physics (Rate*Time=Distance). In a DBMS using one embodiment of the Request Quota technique, RespTime=Resources per Node/Request Quota. Consider a query, as it is issued throughout the day/night/week and as it competes with different levels of demand from a nearly-idle system to an over-burdened one. The resulting response times are a function of the amount of system utilization it can be allocated. When uncontrolled, the resulting response times can vary considerably, as illustrated in FIG. 15A. By fixing the rate at which the query executes by way of the Request Quota, the query can now run with the same consistent response time regardless of the time of day or week that it executes, as shown in FIG. 15B.

In another example, consider the three queries, A, B, and C, shown in Table 1 below that are classified into the same workload that uses the Request Quota method of management. As can be seen, in one embodiment the resulting, consistent response time is a function of only the CPU and IO requirement of the query combined with the fixed Request Quota. As such query A will perform differently than query B and C, but each time query A executes, it will consistently execute with the same resource rate available, leading to a response time that is more consistent with its previous iterations.

In one embodiment, consistent response time is still subject to other factors that may cause the query to execute longer than the Request Quota dictates. Besides low pecking order potentially causing an increase in realized response time, mutexes such as DB locks can impact the DBMS's ability to truly deliver consistent response time. However, in one embodiment the Request Quota technique will not deliver more resources to a query than the quota specifies, which means a given query will not execute in less time than expected. This is useful because most use cases requiring this type of functionality result in users experiencing

TABLE 1

| Query | Actual "node" CPU secs per Node | Request Quota | Resulting CONSISTENT Response Time (sec) |
|---|---|---|---|
| A | .05 | 2% | 2.5 |
| B | 5 | 2% | 250 |
| C | 50 | 2% | 2500 |

"too fast" response times, which leads to expectations that can no longer be met when, for example, a just-upgraded system grows into its new capacity.

In one embodiment, an option to cap a workload's consumption as a whole is provided. This option lessens the likelihood of unconstrained concurrencies allowing high concurrency of a workload to over-burden the system. In such a case, in one embodiment, all concurrent requests will yield a lower Request Quota to result in the workload-level cap specified. When this occurs, the requests within this workload are competing with an unusually high demand within the same workload and consistency may be impacted. However, as with pecking order impacts or database lock issues, Request Quotas maintain a consistent response time floor and do not allow the request to finish too fast.

Figure 16:
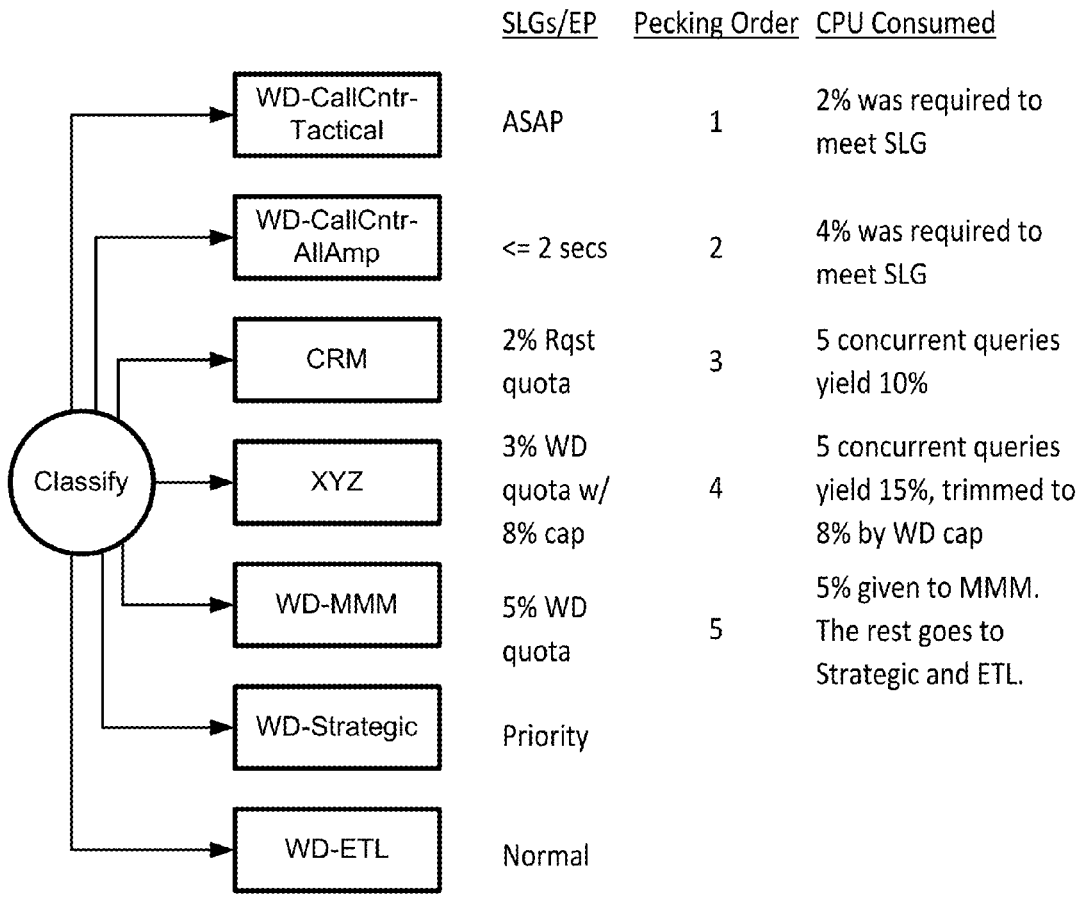

FIG. 16 illustrates an example of two workloads (XYZ and MMM) defined with Request Quotas, where workload XYZ also has a workload-level cap applied. With the cap, in one embodiment, WD-XYZ as a whole will consume no more than 8%. Without the cap, in one embodiment, WD-XYZ would have consumed 15%.

As suggested earlier, a Request Quota can also provide response time consistency across hardware upgrades. In one embodiment, it does that by defining and saving the specified Request Quota in the context of the system it was originally defined on for automatic adjustment. To facilitate that, the DBMS uses normalization data for managing performance metrics, the "uninhibited TPERF", or uTPerf. In one embodiment, uTPerf is a term that identifies the level of node performance assuming no disk I/O or network bottlenecks that would otherwise lead to an idle CPU while waiting for the bottlenecking components to complete their usage. uTPerf is a throughput measure of the CPU power of a node. Request Quota is computed as follows:

Request Quota (RQ)=x % of uTPerf$_{system}$, where:
uTPerf$_{system}$ is the sum of all nodes' uTPerf, derived from "normalization factor" data stores.

$$uTPerf_{system} = \sum_{i=1}^{n} uTPerf_i$$

at run-time, the actual RQ is determined by:

$$ActualRQ = \frac{uTPerf_{atRQSpecificatoin}}{uTPerf_{current}}$$

For example: assume RQ is originally specified on a system having uTPerf$_{atRQSpecification}$=10
RQ=2% (of 10)
1. While system exists as it was at specification:

$$ActualRQ = 2\% \times \frac{10}{10} = 2\%$$

2. When system is upgraded, e.g. to uTPerf current=20:

$$ActualRQ = 2\% \times \frac{10}{20} = 1\%$$

These formulas are effective regardless of the form of upgrade, whether it be additional nodes of the same type, a technology refresh to all new technology, or additional nodes of a different type, as illustrated in the following three examples:

Example 1

Query A before versus after the addition of new nodes. Query A required 10 "node" CPU seconds on the system (5 per node) before the system was upgraded with 2 new nodes, doubling the speed of the system. In one embodiment, the DBMS distributes the work involved in executing Query A across the old and new nodes, with the old nodes doing half the work and the new nodes doing the other half of the work. Table 2 shows the performance of the system before the upgrade and Table 3 shows the performance of the system after the upgrade:

TABLE 2

Old System (uTPerf$_{atRQSpecification}$ = 10, 2 nodes @ same speed)

| Node | Actual "node" CPU secs for Query A | RQ at specification | Actual RQ at Run Time | Resulting Response Time (sec) |
|---|---|---|---|---|
| 1, 2 | 5 | 2% | 2% | 5/2% = 250 seconds |

TABLE 3

New System (uTPerf$_{atRQSpecification}$ = 20, 4 nodes @ same speed)

| Node | Actual "node" CPU secs for Query A | RQ at specification | Actual RQ at Run Time | Resulting Response Time (sec) |
|---|---|---|---|---|
| 1, 2 | 2.5 | 2% | 1% | 2.5/1% = 250 seconds |
| 3, 4 | 2.5 | 2% | 1% | 2.5/1% = 250 seconds |

Example 2

Query A before versus after technology refresh to all faster nodes. Query A required 10 "node" CPU seconds on the system (5 per node) before the system was upgraded by replacing the existing nodes with 2 new nodes. The replacement system needs just 5 "node" CPU seconds, 2.5 per node. Table 4 shows the performance of the system before the upgrade and Table 5 shows the performance of the system after the upgrade:

TABLE 4

Old System (uTPerf$_{atRQSpecification}$ = 10, 2 nodes @ same speed)

| Node | Actual "node" CPU secs for Query A | RQ at specification | Actual RQ at RunTime | Resulting Response Time (sec) |
|---|---|---|---|---|
| 1, 2 | 5 | 2% | 2% | 5/2% = 250 seconds |

TABLE 5

New System (uTPerf$_{atRQSpecification}$ = 20, 2 nodes @ same speed, 2× faster than old system's nodes)

| Node | Actual "node" CPU secs for Query A | RQ at specification | Actual RQ at Run Time | Resulting Response Time (sec) |
|---|---|---|---|---|
| 1, 2 | 2.5 | 2% | 1% | 2.5/1% = 250 seconds |

Example 3

Query A before versus after coexistence upgrade. Query A required 10 "node" CPU seconds on the system before the coexistence upgrade, which adds 12× faster node, thereby doubling the speed of the system. In one embodiment, the DBMS distributes the work involved in executing Query A across the old and new nodes, with the old nodes doing half the work and the new node doing the other half of the work with 2× faster processing power. Table 2 shows the performance of the system before the upgrade and Table 3 shows the performance of the system after the upgrade:

TABLE 6

Old System (uTPerf$_{atRQSpecification}$ = 10, 2 nodes @ same speed)

| Node | Actual "node" CPU secs for Query A | RQ at specification | Actual RQ at RunTime | Resulting Response Time (sec) |
|---|---|---|---|---|
| 1, 2 | 5 | 2% | 2% | 5/2% = 250 seconds |

TABLE 7

New System (uTPerf$_{atRQSpecification}$ = 20, 4 nodes @ same speed)

| Node | Actual "node" CPU secs for Query A | RQ at specification | Actual RQ at RunTime | Resulting Response Time (sec) |
|---|---|---|---|---|
| 1, 2 | 2.5 | 2% | 1% | 2.5/1% = 250 seconds |
| 3 | 2.5 | 2% | 1% | 2.5/1% = 250 seconds |

In one embodiment, uTPerf is a "single number" representing a general difference in performance from configuration to configuration and that individual queries will vary from these single numbers within a ballpark degree. In other words, it may not be possible to get perfect consistency as configurations change but a ballpark consistency that can, if necessary, be fine-tuned.

In one embodiment, the request quota is applied at each individual node. That is, in one embodiment, if the actual Request Quota on a homogeneous system was 2%, that would translate into 2% on any and all nodes. If the request was a single-node query, in one embodiment the single node would realize 2% utilization, and it would realize no utilization on all other nodes because there they are doing no work on the request. Similarly for requests running on only a few CPUs or nodes and skewed queries in that each individual node would be limited to that 2% utilization, and if there was insufficient work to realize the 2% utilization on any node, it would not consume it.

Figure 17:
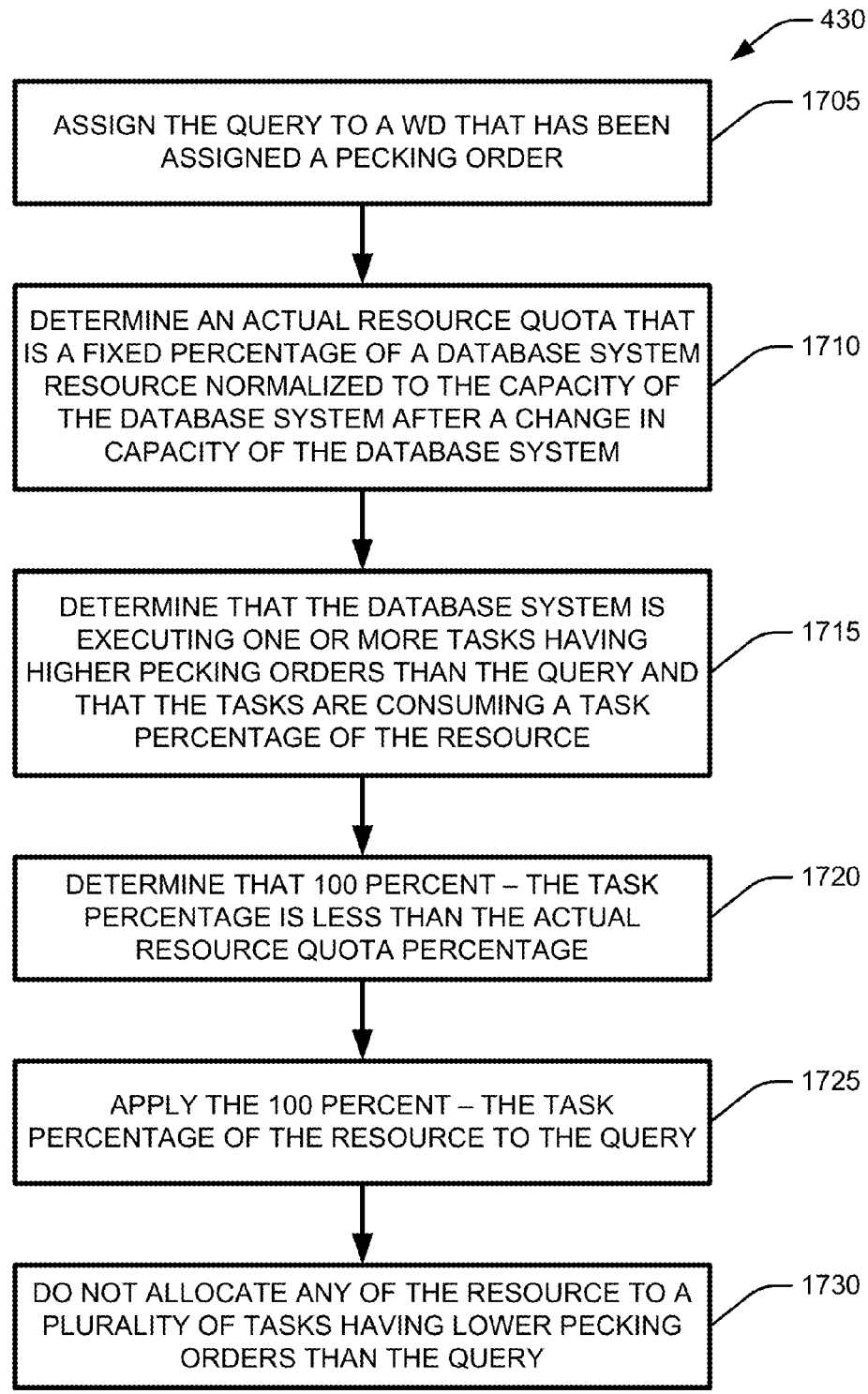
FIG. 17 is a flow chart of one embodiment of the Request Quota resource allocation technique.

In one embodiment of its operation, as shown in FIG. 17, the Request Quota resource allocation technique assigns a query to a WD that has been assigned a pecking order (block 1705). In one embodiment, the technique then determines an actual resource quota that is a fixed percentage of a database system resource normalized to the capacity of the database system after a change in capacity of the database system (block 1710). In one embodiment, the technique then determines that the database system is executing one or more tasks having higher pecking orders than the query and that the tasks are consuming a task percentage of the resource (block 1715). In one embodiment, the technique then determines that the available percentage–the task percentage is less than the actual resource quota percentage (bock 1720). In one embodiment, the technique then applies the available percentage percent–the task percentage of the resource to the query (block 1725). In one embodiment, the technique does not allocate any of the resource to a plurality of tasks having lower pecking orders than the query (block 1730).

Managing Resources Among Multiple Groups of Workloads

In one embodiment, a modified resource allocation technique allows the management of resources among multiple groups of workloads. In one embodiment, the modified resource allocation technique is useful, for example, in situations in which a database system is servicing more than one business unit. For the purposes of this application, a business unit is defined to be any entity that uses a database. For example, a business unit can be a company, a division of a company, a cost center within a company, or any similar business entity.

In one embodiment, a database system, such as that illustrated in FIG. 1, is used by a plurality of business units simultaneously, with each business unit being responsible for the cost of its share of the system and with each business unit being entitled to its share of the system. In one embodiment, each of the business units is associated with a collection of workloads.

Consider, for example, the system illustrated in FIG. 18. The database system is being shared by three different sized entities represented by 3 countries: United States, Germany and Hong Kong. Assume they have the workload definitions illustrated in FIG. 18, with the illustrated pecking order, SLG directives and/or timeshare directives.

In one embodiment, the database system resources are allocated such that a percent of resources is specifically allocated to a collection of workloads, those collections here being "Germany", "USA" and "HK." In one embodiment, those percentages can be defined as either a FIXED percentage or a DYNAMIC percentage:

FIXED: The collection will never use more than the specified percentage, nor will it offer up its idle resources to other collections.

DYNAMIC: The collection can use more than its specified percentage if resources that would otherwise be consumed by other collections lay idle due to lack of demand. The collection can also offer up its idle resources to the degree indicated by a "Greediness Value."

In one embodiment, the Greediness Value can range from 0 ("generous") to 100 ("greedy"), and indicates the percentage of the collection percentage that the collection want to keep for itself always. That is, it never allows another collection access to the "greedy" portion, even if it is idle. The "generous" portion can be allocated to other collections if and only if this collection has no demand for it.

Expressed mathematically:

$$C_m\_boost_{donor} = \frac{(100 - C_{donor}\_GV)}{100} \cdot C_{donor}\_idle \cdot \frac{C_m\_share}{100 - C_{donor}\_share} \quad (1)$$

where:
there are n collections: $C_{1-n}$;
$C_m\_boost_{donor}$ is the increased allocation of a resource to collection $C_m$ resulting from the generosity of collection $C_{donor}$;
$C_{donor}\_GV$ is the Greediness Value of collection $C_{donor}$;
$C_{donor}\_idle$ is the percentage of the resource allocated to collection $C_{donor}$ that is idle; and
$C_i\_share$ is the share of the resource allocated to collection $C_i$.

In one embodiment, a donee collection may be the recipient of donations from a plurality of donor collections. In one embodiment, the percentage of a resource available to a donee collection is the sum of the percentage of the resource allocated to the donee collection and the percentage of boost percentages donated by donor collections.

In one embodiment, when all collections are demanding their designated share of the system, the workload management mechanisms (priority management, automatic throttling, etc.) work independently as if there are three separate systems being workload managed. The collections demand their designate shares of the system in a number of situations:

(1) when the Greediness Value of all the collections is set to 100, (2) all collections are full active submitting requests to the system, (3) all collections are in fixed allocation mode (equivalent to having the Greediness Value of all the collections set to 100), some of the collections fully demanding their request load and some not but the system in fixed allocation mode, and (4) other combinations of (1), (2), and (3). As illustrated in FIG. 19, each collection's Pre-Emptive workload needs are met, then remaining resources are relinquished to the timeshare workloads, each collection being managed independently of the other collections.

FIG. 20 illustrates a situation in which one of the collections (USA) has been defined with a Greediness Value of 0. (ie. Fully Generous) and is not using all of its allocated resources. This might occur, for example, when it is 1:00 am in the United States and most users are sleeping, 10:00 am in Germany and users are just getting started with their days, and 5:00 pm in Hong Kong and most users are winding down their days. In one embodiment, the USA collection donates its unused portions of a resource or resources to the Germany and Hong Kong collections and the Germany and Hong Kong collections receive the portion of donated resource or resources in proportion to their defined share of the system. That is, with 15% of the system resources freed up by USA, Germany's and Hong Kong's resources are boosted by their proportional share of that 15%. This can be seen by applying equation (1), where:

$C_{USA}\_GV=0$;
$C_{USA}\_idle=15\%$
$C_{Germany}\_boost_{USA}=(100-0)/100*15*(55/(100-35))=13\%$
$C_{HK}\_boost_{USA}=(100-0)/100*15*(10/(100-35))=2\%$ The other thing to note is how Germany and Hong Kong use their boosted share. In both cases, the pre-emptive workloads in each collection are already meeting their SLGs, so, in one embodiment, the boosted resources are effectively assigned to the timeshare WDs within each collection, just as they would have been assigned if each collection were an independent system that suddenly grew in capacity by similar amounts.

In another example, shown in FIG. 21, the Hong Kong and USA collections are not demanding their share of the system resources. But in this example, both collections have a Greediness factor of 100 (i.e., Fully Greedy). In this case, in one embodiment, the idle resources owned by those two collections are not given to the remaining collection (Germany), and the system will run 22% idle, just as it would if the three collections were in three physically separate systems fixed at a particular capacity.

FIG. 22 illustrates that, in one embodiment, a collection will execute its workload management directives independently of other collections, even if the other collections could use those resources for higher-priority work when another collection is able to satisfy the demand of lower-priority work. For example, Germany has a pre-emptive workload, WD-DE-CRM at pecking order 4, that is unable to satisfy its SLG. Further, the Germany Timeshare workloads (WD-DE-Strategic and WD_DE_ETL at deterministic levels 3 and 4 respectively) are essentially being starved of access to the system. Yet the USA collection and the Hong Kong collection are able to fully satisfy all their pre-emptive workload's SLGs, plus satisfy a good portion of their timeshare WD's demand, which is just as it would be if the collections were executing in three physically separate systems.

In embodiment, resources are allocated among the collections at the beginning of a time slice. In one embodiment, resources are allocated among the collections at the end of a time slice. In one embodiment, resources are allocated among the collections at some other point within a time slice.

In one embodiment, resources are reallocated among the collections for each time slice. In one embodiment, resources are reallocated among the collections every nth time slot, where n is greater than 1.

Figure 23:
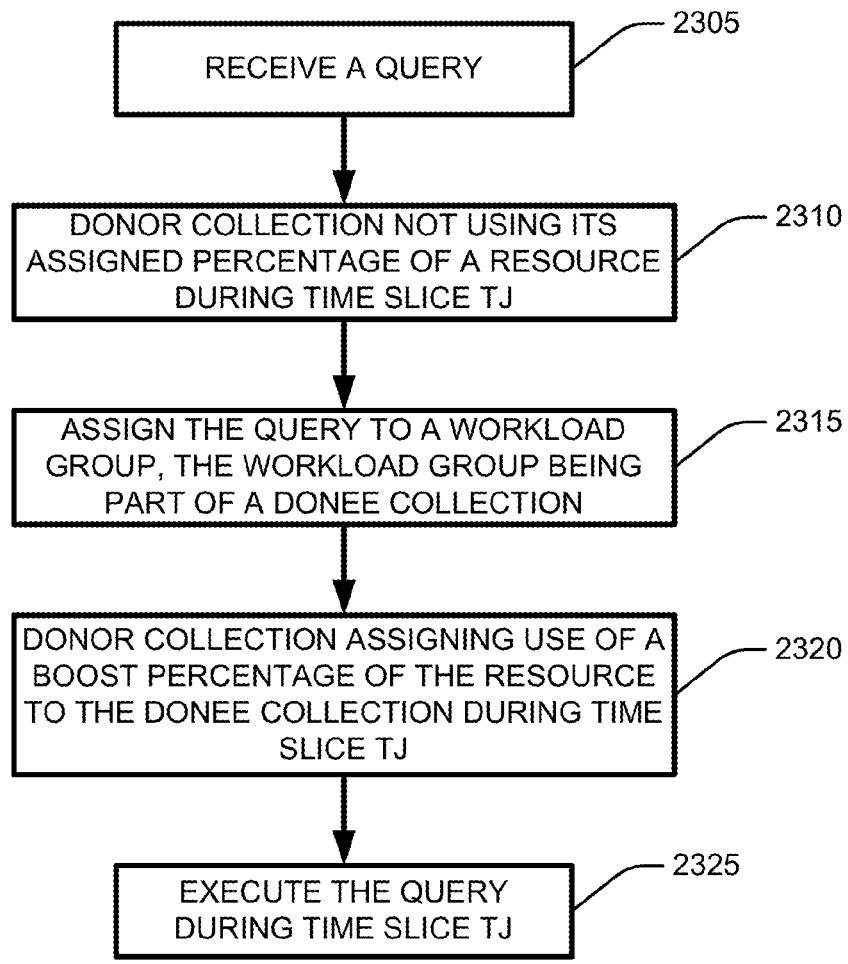

In one embodiment, as shown in FIG. 23, a computer running a database system receives a query (block 2305). In one embodiment, the database system is servicing a number of collections, as illustrated in FIGS. 18-22. In one embodiment, as illustrated in FIGS. 18-22, each collection includes a plurality of workload groups. In one embodiment, as illustrated in FIGS. 18-22, each collection is assigned a percentage of a resource for its use.

In one embodiment, as illustrated in FIGS. 19-22, a donor collection is not using its assigned percentage of a resource during a time slice tJ (block 2310). In one embodiment, time slice tJ is as defined above. In one embodiment, the length in time of time slice tJ is less than the time in which the query is expected to execute.

In one embodiment, the query is assigned to a workload group (block 2315). In one embodiment, the workload group to which the query is assigned is part of a donee collection (block 2315).

In one embodiment, the donor collection donates use of a boost percentage of the resource to the donee collection during the time slice tJ (block 2320). In one embodiment, the boost percentage is proportional to the percentage of the resource assigned to the donee collection, the percentage of the resource assigned to the donor collection, and a Greediness Value related to the amount of the donor collection's allocated percentage of the resource available to be donated.

In one embodiment, the database system executes the query during time slice tJ (block 2325), with the donee collection using its allocated percentage of the resource plus the boost percentage of the resource.

In one embodiment, this technique provides workload management of a mix of both workloads and collectives with a single system, where the needs of a "virtual" entity are considered independently of other virtual entities or collections within the single system. In one embodiment, this helps end-users maximize economies of scale without sacrificing workload management objectives they would otherwise have achieved if the collections were operating on separate, physical systems. In one embodiment, the technique also maximizes economies of scale by allowing the collections to reside on a single system that can size each collection in small granularities, i.e., smaller than the smallest physical system, or allow fractional increments in collection size (i.e., increase entity by 1.5 nodes). In one embodiment, the method maintains the ability to meet a collection's workload's Service Level Goals independently of other collections. In one embodiment, the technique allows a definition of a Greediness Factor to determine the amount of sharing of idle resources that can occur to further maximize economies of scale. In one embodiment, the technique does all this while maintaining an intuitive, well-understood behavior of each collection's workload performance.

In one embodiment, automatic throttling decisions, as described in co-pending application Ser. No. 12/945,064, entitled CALCULATING PRIORITY INDICATORS FOR REQUESTS IN A QUEUE, filed on Nov. 12, 2010, incorporated by reference, are made cognizant of each collection rather than being based solely on the system resources as a whole.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method, comprising:
receiving a query to be run on a database system running on a computer, the database system servicing a plurality of collections, each collection comprising a plurality of workload groups, each collection being assigned a percentage of a resource for its use;
a donor collection, $C_{donor}$, not using its assigned percentage of the resource during a time slice tJ, the length in time of time slice tJ being less than a time in which the query is expected to execute;
assigning the query to a workload group, the assignment being determined by the computer applying a workload classification and an exception criteria to parameters of the query, the workload group being part of a donee collection, $C_{donee}$, different from the donor collection;
the donor collection donating, through the computer, use of a boost percentage of the resource to the donee collection during the time slice tJ, the boost percentage being proportional to the percentage of the resource assigned to the donee collection, the percentage of the resource assigned to the donor collection, and a Greediness Value related to the amount of the donor collection's allocated percentage of the resource available to be donated; and
executing the query by the computer during time slice tJ, with the donee collection using its allocated percentage of the resource plus the boost percentage of the resource to execute the query.

2. The method of claim 1 wherein:
the boost percentage is calculated by the computer according to the following equation:

$$C_{donee}\_boost_{donor} = \frac{(100 - C_{donor}\_GV)}{100} \cdot C_{donor}\_idle \cdot \frac{C_{donee}\_share}{100 - C_{donor}\_share}$$

where:
there are n collections: $C_{1-n}$;
$C_{donee}\_boost_{donor}$ is the increased allocation of a resource to collection $C_{donee}$ resulting from the generosity of collection $C_{donor}$;
$C_{donor}\_GV$ is the Greediness Value of collection $C_{donor}$;
$C_{donor}\_idle$ is the percentage of the resource allocated to collection $C_{donor}$ that is idle; and
$C_i\_share$ is the share of the resource allocated to collection $C_i$.

3. The method of claim 1 wherein:
a second donor collection is not using its assigned percentage of the resource during time slice tJ;
the second donor collection donating, through the computer, use of a second boost percentage of the resource to the donee collection during the time slice tJ, the second boost percentage being proportional to the percentage of the resource assigned to the donee collection; and
executing the query by the computer during time slice tJ, with the donee collection using its allocated percentage of the resource plus the boost percentage of the resource and the second boost percentage of the resource to execute the query.

4. A database system, running on a computer, the database system comprising:
one or more nodes;
a plurality of CPUs, each of the one or more nodes providing access to one or more CPUs;
a plurality of virtual processes, each of the one or more CPUs providing access to one or more virtual processes;
each virtual process configured to manage data, including rows from the set of database table rows, stored in one of a plurality of data-storage facilities;
a process to:
receive a query to be run on the database system, the database system servicing a plurality of collections, each collection comprising a plurality of workload groups, each collection being assigned a percentage of a resource for its use;
a donor collection, $C_{donor}$, not using its assigned percentage of the resource during a time slice tJ, the length in time of time slice tJ being less than a time in which the query is expected to execute;
assign the query to a workload group, the assignment being determined by the computer applying a workload classification and an exception criteria to parameters of the query, the workload group being part of a donee collection, $C_{donee}$, different from the donor collection;
the donor collection donating, through the computer, use of a boost percentage of the resource to the donee collection during the time slice tJ, the boost percentage being proportional to the percentage of the resource assigned to the donee collection, the percentage of the resource assigned to the donor collection, and a Greediness Value related to the amount of the donor collection's allocated percentage of the resource available to be donated; and
execute the query by the computer during time slice tJ, with the donee collection using its allocated percentage of the resource plus the boost percentage of the resource to execute the query.

5. The database system of claim 4 wherein:
the boost percentage is calculated by the computer according to the following equation:

$$C_{donee}\_boost_{donor} = \frac{(100 - C_{donor}\_GV)}{100} \cdot C_{donor}\_idle \cdot \frac{C_{donee}\_share}{100 - C_{donor}\_share}$$

where:
there are n collections: $C_{1-n}$;
$C_{donee}\_boost_{donor}$ is the increased allocation of a resource to collection $C_{donee}$ resulting from the generosity of collection $C_{donor}$;
$C_{donor}\_GV$ is the Greediness Value of collection $C_{donor}$;
$C_{donor}\_idle$ is the percentage of the resource allocated to collection $C_{donor}$ that is idle; and
$C_i\_share$ is the share of the resource allocated to collection $C_i$.

6. The database system of claim 4 wherein:
a second donor collection is not using its assigned percentage of the resource during time slice tJ;
the second donor collection donating, through the computer, use of a second boost percentage of the resource to the donee collection during the time slice tJ, the second boost percentage being proportional to the percentage of the resource assigned to the donee collection; and the process executes the query by the computer during time slice tJ, with the donee collection using its allocated percentage of the resource plus the boost percentage of the resource and the second boost percentage of the resource to execute the query.

7. A computer program, stored in a non-transitory computer-readable storage medium, the program comprising executable instructions that cause a computer to:

receive a query to be run on a database system running on a computer, the database system servicing a plurality of collections, each collection comprising a plurality of workload groups, each collection being assigned a percentage of a resource for its use;

a donor collection, $C_{donor}$, not using its assigned percentage of the resource during a time slice tJ, the length in time of time slice tJ being less than a time in which the query is expected to execute;

assign the query to a workload group, the assignment being determined by the computer applying a workload classification and an exception criteria to parameters of the query, the workload group being part of a donee collection, $C_{donee}$, different from the donor collection;

the donor collection donating, through the computer, use of a boost percentage of the resource to the donee collection during the time slice tJ, the boost percentage being proportional to the percentage of the resource assigned to the donee collection, the percentage of the resource assigned to the donor collection, and a Greediness Value related to the amount of the donor collection's allocated percentage of the resource available to be donated; and execute the query by the computer during time slice tJ, with the donee collection using its allocated percentage of the resource plus the boost percentage of the resource to execute the query.

8. The computer program of claim 7 wherein:
the boost percentage is calculated by the computer according to the following equation:

$$C_{donee}\_boost_{donor} = \frac{(100 - C_{donor}\_GV)}{100} \cdot C_{donor}\_idle \cdot \frac{C_{donee}\_share}{100 - C_{donor}\_share}$$

where:
there are n collections: $C_{1-n}$;

$C_{donee}\_boost_{donor}$ is the increased allocation of a resource to collection $C_{donee}$ resulting from the generosity of collection $C_{donor}$;

$C_{donor}\_GV$ is the Greediness Value of collection $C_{donor}$;

$C_{donor}\_idle$ is the percentage of the resource allocated to collection $C_{donor}$ that is idle; and $C_i\_share$ is the share of the resource allocated to collection $C_i$.

9. The computer program of claim 7 wherein:
a second donor collection is not using its assigned percentage of the resource during time slice tJ;

the second donor collection donating, through the computer, use of a second boost percentage of the resource to the donee collection during the time slice tJ, the second boost percentage being proportional to the percentage of the resource assigned to the donee collection; and the computer executes the query during time slice tJ, with the donee collection using its allocated percentage of the resource plus the boost percentage of the resource and the second boost percentage of the resource to execute the query.

* * * * *